(12) United States Patent
Harm et al.

(10) Patent No.: US 8,826,304 B2
(45) Date of Patent: Sep. 2, 2014

(54) VIRTUAL OBJECT INDIRECTION IN A HOSTED COMPUTER ENVIRONMENT

(75) Inventors: Michael W. Harm, New York, NY (US);
Hugo G. Fierro, New York, NY (US);
Farzad Khosrowshahi, Pleasantville, NY (US)

(73) Assignee: Google Inc., Mountain View, CA (US)

( * ) Notice: Subject to any disclaimer, the term of this patent is extended or adjusted under 35 U.S.C. 154(b) by 531 days.

(21) Appl. No.: 12/540,927

(22) Filed: Aug. 13, 2009

(65) Prior Publication Data

US 2011/0041141 A1    Feb. 17, 2011

(51) Int. Cl.
*G06F 9/54* (2006.01)
(52) U.S. Cl.
CPC ..................... *G06F 9/541* (2013.01)
USPC ........................... 719/318; 719/313
(58) Field of Classification Search
CPC ........................................... G06F 9/541
USPC ........................... 719/318, 328, 313
See application file for complete search history.

(56) References Cited

U.S. PATENT DOCUMENTS

| | | | | |
|---|---|---|---|---|
| 6,941,337 | B2* | 9/2005 | Casais | 709/202 |
| 7,275,240 | B2* | 9/2007 | Cole et al. | 717/137 |
| 7,873,591 | B2* | 1/2011 | Mital et al. | 706/52 |
| 7,882,547 | B2* | 2/2011 | Kaler et al. | 726/5 |
| 8,332,878 | B2* | 12/2012 | Harm | 719/328 |
| 8,453,126 | B1* | 5/2013 | Ganelin | 717/136 |
| 2002/0082988 | A1* | 6/2002 | Ujiie et al. | 705/39 |
| 2002/0091559 | A1* | 7/2002 | Beniyama et al. | 705/9 |
| 2002/0120672 | A1 | 8/2002 | Butt et al. | |
| 2003/0070006 | A1 | 4/2003 | Nadler et al. | |

(Continued)

FOREIGN PATENT DOCUMENTS

| | | |
|---|---|---|
| EP | 1 126 657 A2 | 8/2001 |
| JP | H11-96009 | 4/1997 |

(Continued)

OTHER PUBLICATIONS

International Search Report & Written Opinion for Application No. PCT/US2010/045531, dated Apr. 28, 2011, 9 pages.
Japanese Office Action for corresponding Japanese application No. 2012-524920, dated Feb. 10, 2014.

*Primary Examiner* — Emerson Puente
*Assistant Examiner* — Willy W Huaracha
(74) *Attorney, Agent, or Firm* — Birch, Stewart, Kolasch & Birch, LLP

(57) ABSTRACT

A computer-implemented method of managing computer macros is discussed. This method includes identifying a macro stored at a hosted computer system, executing the macro by traversing lines of commands in the macro, and identifying one of a plurality of different services that are responsive to macros. The method also includes converting a command in the macro from a format associated with a macro language in which the macro is authored, to a command format associated with the identified one of the plurality of different services and providing information received from the one of a plurality of different services to the macro or an application corresponding to the macro, after converting the information into a format usable by the macro or the application corresponding to the macro.

19 Claims, 9 Drawing Sheets

(56) References Cited

U.S. PATENT DOCUMENTS

| | | |
|---|---|---|
| 2003/0097649 A1* | 5/2003 | Jones et al. .................. 717/115 |
| 2003/0236921 A1* | 12/2003 | Cordery et al. .............. 709/310 |
| 2007/0094372 A1 | 4/2007 | Hariharan et al. |
| 2007/0150741 A1 | 6/2007 | Kaler et al. |
| 2008/0104042 A1* | 5/2008 | Gutt et al. ......................... 707/4 |
| 2008/0178199 A1* | 7/2008 | Tanabe ......................... 719/320 |
| 2008/0183925 A1* | 7/2008 | Bellows et al. .............. 710/105 |
| 2008/0189235 A1 | 8/2008 | Mital et al. |
| 2008/0301120 A1 | 12/2008 | Zhu et al. |
| 2009/0150544 A1 | 6/2009 | Tamura |
| 2009/0265610 A1* | 10/2009 | Leonard et al. ............... 715/234 |

FOREIGN PATENT DOCUMENTS

| | | |
|---|---|---|
| JP | 2001-216211 A | 8/2001 |
| JP | 2003-501726 A | 1/2003 |
| JP | 2009-146005 A | 7/2009 |
| WO | WO 00/73924 A2 | 12/2000 |

* cited by examiner

600

Macro Rule Name [abczyx] [601] ▽ Copy from [628] ▽ [Save] [Undo] [Display] [Cancel] } 626

Description [This macro will text me when that large cloud drawings file hits my inbox] [630]

Effective Date [Now] [632] ▽ Expiration Date [Never] [634] ▽ Run on... [Weekdays] [636] ▽

---

602 Macro Trigger

Property [email] [608] ▽

Activity
[Incoming message]
Inbox size
Tag size
[610]

Parameters
[611]

---

604 Macro Processing

Conditions ○ Any ● All } 617

☒ From user
☐ From domain
☐ From user in group
☐ User as CC:
☒ Contains words in RE:
☐ Contains words in body
[612]

[Advanced Boolean] 618

Check Services
Locator [614] ▽

Location of Sender
[Location of User X]
Location of CC
[616]

---

606 Macro Output

Property [email] [620] ▽

Action
☐ Send me email
☐ Call me
☒ Text me
☐ Send return email
☐ Send user X email
[622]

Parameters
[624]

FIG. 6

VIRTUAL OBJECT INDIRECTION IN A HOSTED COMPUTER ENVIRONMENT

TECHNICAL FIELD

This document relates to network-based delivery of electronic content.

BACKGROUND

A macro is a set of instructions that can be executed inside one or more computer applications to provide enhanced and automatic interactivity with those applications, where at least part of the macro represents steps that could otherwise be taken manually by a user of an application. For example, a macro could be written so as to compute a value from certain numbers in a spreadsheet application and copy the value to a related word processing application on a desktop computer. A user could assign a "hot key" combination to the macro so that the macro can be run easily by the user simply by pressing the hot key combination. As another example, a macro could also be written to cause certain electronic messages (e.g., those from a spouse, client, or boss) to be elevated in importance so that they can be more easily seen by a user of a computing device. One familiar macro-based system is Visual Basic for Applications for the MICROSOFT OFFICE productivity suite.

SUMMARY

This document discusses systems and techniques for creating and using macros in a hosted computing system, often referenced as "the cloud." The macros can be stored and executed from a macro server sub-system, rather than from a client device, thus allowing the macros to be shared easily between users, because all qualified users can access the macros from many location as long as they can get on a network and provide their credentials. In addition, the macros can readily access a number of applications and services, provided either by the hosted computing system or from third party systems that are separate from the hosted computer system. Such services can include services that provide information about locations of various users (as determined, e.g., from GPS on their mobile devices), services that provide news and weather feeds, and other such services. The applications can include, for example, email and other messaging applications, productivity applications such as spreadsheets and word processors, mapping applications, and mash-ups of various applications that can be presented together in a single presentation (which can be accessed by a user and even developed by the user to provide customized output from a macro). The applications may be presented to the user via one or more web pages displayed using a web browser. The systems and techniques may also provide for the recording of macros, where a user can invoke a macro recorder and the recorder can track the user's actions on a computer and turn those actions into macro code so that the actions can be repeated automatically at a later time when the user runs the macro.

Where multiple different applications are to be controlled by the macros and multiple services are to be accessed by the macros, a service interface may be provided so that a macro programmer can use a single macro language to communication with all the various services and applications. The service interface can translate commands, parameters, instructions, data, and other items from one protects the programmer. The interface may operate by generating an object for each service with which a macro needs to communicate and defining an access method for each object. The objects can be provided with security wrappers to prevent malicious or sloppy code from accessing system resources unnecessarily, and with quota enforcing layers that prevent over-use of a macro or over-accessing of a service (e.g., via a virus, botnet, or similar mechanism).

Third-party services that the macros may access can include SOAP services or other similar services that may be accessed from a domain that is separate from the domain that provides the services, and that provide a well-known mechanism for sharing information over the internet. For example, a third-party service provider may compile up-to-date weather data and may make the data available to other services upon request.

In a first aspect, a computer-implemented method manages computer macros. This method includes identifying a macro stored at a hosted computer system, executing the macro by traversing lines of commands in the macro, and identifying one of a plurality of different services that are responsive to macros. The method also includes converting a command in the macro from a format associated with a macro language in which the macro is authored, to a command format associated with the identified one of the plurality of different services and providing information received from the one of a plurality of different services to the macro or an application corresponding to the macro, after converting the information into a format usable by the macro or the application corresponding to the macro.

Implementations can include any, all or none of the following features. The macro can be identified from a URL that calls the macro and that includes a path and name for the macro. The method can further include providing information received from the one of a plurality of different services comprises providing the information through a masqueraded object that hides characteristics of an object used to obtain the information from at least one of the plurality of different services. The method may also include determining whether a call to the one of the plurality of services from a user corresponding to the executing macro exceeds a determined level, and preventing execution of the macro if the call exceeds the quota. Determining whether a call to the one of the plurality of services from a user corresponding to the executing macro exceeds a determined level comprises wrapping the macro in a quota wrapper that operates as an adapter between the macro and one or more objects, and implements use restrictions on the macro.

In some aspects, the method may also include receiving notice of an event on a hosted computer system, wherein the event is independent of a user's status on the hosted computer system, associating the event with the macro and an account of the user with the hosted computer system, and executing the macro on the user's account. The method may include converting a command in the macro from a format associated with a macro language in which the macro is authored, to a command format associated with the identified one of the plurality of different services comprises applying portions of the macro to a translation table stored on the hosted computer system. The method may also include converting a command in the macro from a format associated with the language in which the macro is authored, to a command format associated with an application so as to control the application using the macro. The method may also include transmitting a message to the user to notify the user about an operation of the application. The message is selected from a group consisting of an electronic mail message, a telephone voice message, and a text message.

In other aspects, one of a plurality of different services can be selected from a group consisting of a location service, an email service, and a SOAP service. The method may also include converting the command in the macro from the format associated with the macro language in which the macro is authored, to the command format associated with the identified one of the plurality of different services comprises wrapping an access method to the service using a Java object.

In another implementation, a computer-implemented system manages computer macros using a system that includes a plurality of hosted applications operable from the hosted computer system, a macro data store storing a plurality of macros that are each assigned to a user account on the hosted computer system and that each define a series of actions to be executed by at least one of the plurality of hosted applications, and a processor to execute a service interface that, when executed, defines one or more objects for each of a plurality of services accessible by the system, wherein the one or more objects each translate communications from the plurality of macros in a first language to one or more of the plurality of services in a second language that differs from the first language.

Implementations can include any, all, or none of the following features. The system may include an event handler programmed to receive notifications of events occurring at the plurality of hosted applications and to cause execution of the plurality of macros in response to receive the notifications of events. The objects each wrap an access method that defines a communication mechanism for communicating with one of the plurality of services. The system may further include one or more security wrappers that operate as adapters between executing macros and the one or more objects, and that prevent a macro from running without positive user indications regarding the macro. The system may also include one or more quota enforcing layers programmed to prevent execution of one or more of the plurality of macros above a determined level. The determined level is defined by a number of executions of a macro on behalf of a particular user account in a time period.

In yet another implementation, a computer-implemented system for managing computer macros includes a plurality of hosted applications operable from the hosted computer system, a macro datastore storing a plurality of macros that are each assigned to a user account on the hosted computer system and that each define a series of actions to be executed by at least one of the plurality of hosted applications, and a means for executing one or more of the macros in a first format and to translate information from the execution to one or more services providing information in response to call from the macro in a second format that is different from the first format.

The details of one or more embodiments are set forth in the accompanying drawings and the description below. Other features and advantages will be apparent from the description and drawings, and from the claims.

DESCRIPTION OF DRAWINGS

FIG. 6 shows an example screen shot of a macro construction system.

Like reference symbols in the various drawings indicate like elements.

DETAILED DESCRIPTION

Figure 1:
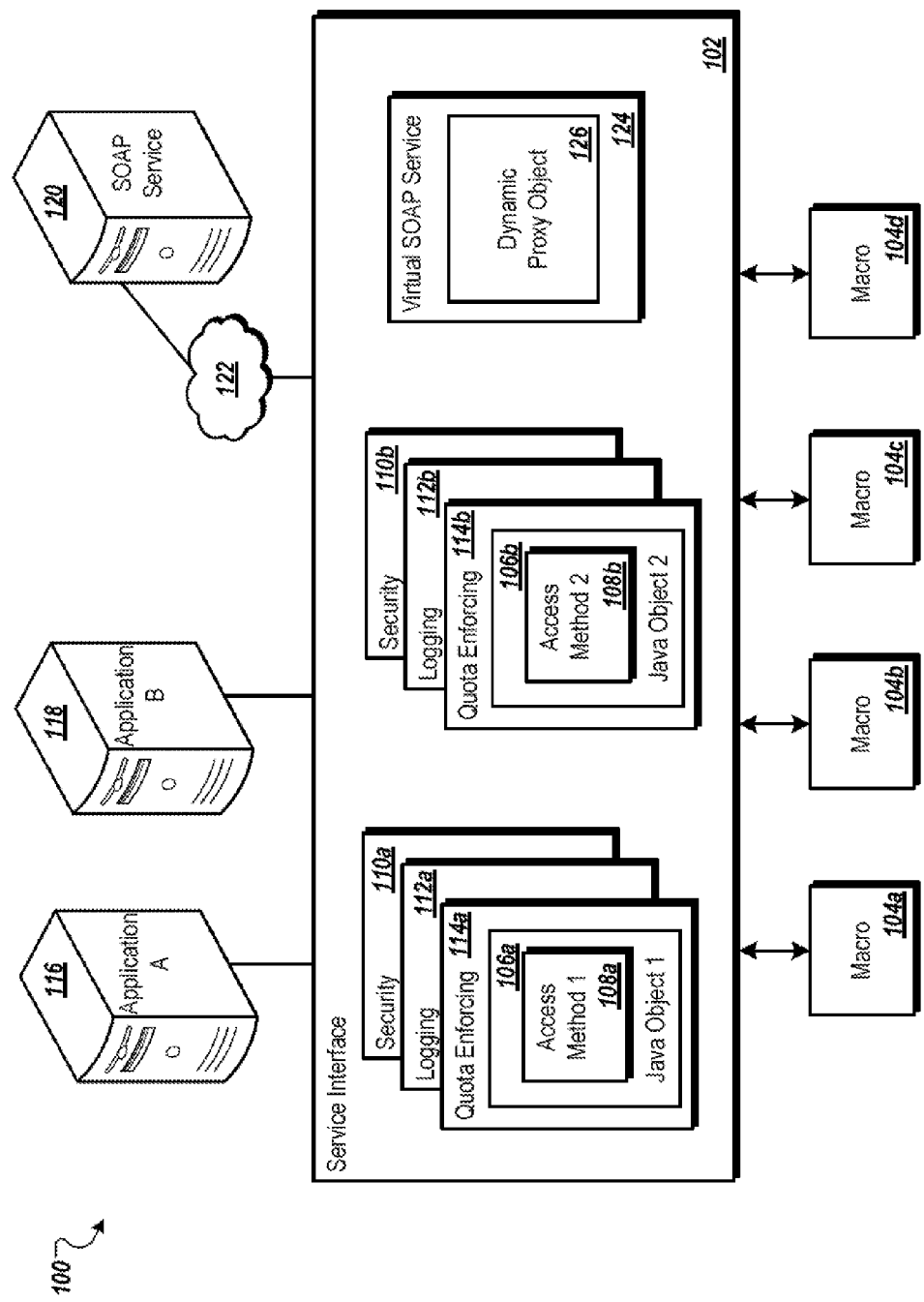
FIG. 1 is a conceptual diagram showing structures for permitting universal programming for macros in a hosted computer system.

FIG. 1 is a conceptual diagram showing structures for permitting universal programming for macros in a hosted computer system 100. Such operation can be contrasted with macro execution that occurs on a client device or on a server that is directed to a single client device (e.g., via a remote desktop connection service or VPN), because macro execution on a hosted system enables, among other things, execution of the macro from various clients, such as a desktop computer, a net book computer, or from a publicly available computer such as a computer in an internet cafe. Also, such a macro can be shared easily between users, by a first user defining access restrictions on the macro that permit other users (e.g., users who access the system from the same domain as the initial user) to run the macro when using their own applications. And such a macro can be executed for a user even when the user is not on-line, such as when an input external to the user and to the user's computer triggers the beginning of macro execution. Moreover, when the hosted system has multiple registered users who are related to each other (e.g., they all work for the same business organization), macros running in a hosted system can produce complex workflows that span across applications and/or data stores that correspond to multiple of such users.

In such a system, a macro may be particularly useful when it can access information from multiple different services, including services provided by third parties that differ from the provider of the hosted system, and when it can work with multiple different applications in the hosted system, such as messaging applications and business productivity applications. However, such diverse services and applications may have diverse communication structures and protocols. As a result, a macro server sub-system associated with the system 100 may interpret into different formats as a macro is run so that a macro author can access many resources while using a single macro language. For example, an object model may be defined for the different services that are exposed to the macro author, such as manipulating spreadsheets and a calendar, fetching web content, sending emails, accessing their calendar, translating text, etc. The object model may be represented using, for example, Java objects. Each Java object may wrap an access method to the underlying service. Communication may occur with first-party resources (i.e., those provided by the same organization that provides the macro server sub-system) using remote procedure calls, while communication with third-party resources (those provided by other organizations, such as via a domain that differs from the domain through which the user accesses the hosted computer system) may use web content fetching such as in the form of SOAP or similar services.

Where the service interface is available, a macro author may produce macros without needing knowledge of or expertise in the provided service architectures for the various other services. A macro server sub-system can act, in effect, as an abstraction layer (e.g., service interface) between an application server (or a service provider) and a macro. In such a manner, a user may communicate with the application server (or another resource provider) using a simple and easy-to-implement command set and language, and need not concern himself or herself with potentially more difficult interaction that would otherwise be required to communicate directly with the application server (or other service provider). For example, a macro server sub-system can translate control commands for controlling the operation of applications or services on the application server, and can also pass data back and forth between the user and applications or services that are hosted on the application server (or a third-party provider's server), either with or without making modifications to the data. In one example, a user can implement a macro to call a number of services without having to directly access internal instructional calls proprietary to that service.

To this end, and referring now more specifically to FIG. 1, there are shown server systems and service interfaces 102 that communicate with client computing devices using one or more macros 104a-d. The macros 104 can provide data and services by multiple mechanisms, where one such mechanism is directly associated with abstracting data and services that are internal to a system, and another mechanism is associated with abstracting data and third party services that are external to the system.

Third-party services may include SOAP services or other similar external services that may be accessed from a domain that is separate from the domain that provides the services, and that provide one or more well-known mechanisms for sharing information over the internet (e.g., published in an API). For example, a third-party service provider may compile up-to-date weather data and may make the data available to other services upon request.

The service interface 102 can store data objects, such as Java objects 106a and 106b or third party data objects. Java objects 106a and 106b may represent models that can be defined for the different services that are exposed to the end user, such as manipulating spreadsheets, fetching web content, sending emails, accessing their calendar, uploading blog posts, translating text, etc.

Each Java object 106a and 106b has an access method 108a and 108b, respectively, that can be used by the macros 104 to employ services or functionality stored in the Java objects 106a and 106b. The service interface 102 can help ensure that a user can gain seamless access to services and applications that are provided in the hosted computing system 100, via access methods 108, without the system 100 exposing the internal services to the user.

Each Java object can wrap an access method to the underlying service. The access methods may be represented by internal direct network calls (for spreadsheets and translations), GData (for calendar applications), internal mail services (for email), and other access methods (for web content fetching). Many of these services need not be exposed directly to the end user.

The service interface 102 can protect the services from being exposed directly to an end user. For example, the service interface 102 can provide "wrappers" or "decorators" around an underlying data object for purposes of eliminating the risk of exposing internal services to end users. A wrapper represents a software layer that functions as an adapter between a macro and a Java object, such as Java objects 106a or 106b. In some implementations, wrappers can help ensure that access is provided to data objects regardless of which applications or services the data objects were originally designed to run in. Moreover, the wrappers can enable the use of devices, applications, services, or other data for which no generic access for the particular data objects are available.

In some implementations, a wrapper can provide a layer of security for a provider and/or an end user. For example, the service interface 102 includes a security layer 110a that can wrap the Java object 106a. The security layer 110a is additional code that surrounds the macro code itself, for instance, not allowing the macro code to run unless positive actions are taken by the user. In some implementations, the action can be to be for the user to select an on-screen control marked "OK" or in some other way approve the macro. Before providing such approval, the user may be shown a warning that explains the services or other resources that the macro could affect, and the user may also be given the ability to define a subset of resources that the macro will be allowed to affect, while preventing the macro from affecting other resources.

The service interface 102 also includes logging layers 112a and 112b that can capture user calls and provide a transcript of a user session. The logging layers 112a and 112b can log each operation that is performed as part of executing a macro, the duration of the operation, the prevalence of errors in the operation, and a user's source language or region in which the operation was requested.

The service interface 102 also includes quota enforcing layers 114a and 114b which can protect a service provider from service abuse and protect a user from spam. For example, the quota enforcing layers 114a-b can detect if a particular account was set up in bulk to spam a service by using spam scoring programs that may help find such bulk account creation. The system 100 can use the quota enforcing layers 114a-b to detect if a large number of activities were requested or executed in a short time period since spammers often exhibit this behavior. In addition, the quota enforcing layers 114a-b can protect against abusive use by rate-limiting users' activity. For example, the system 100 can use the quota enforcing layers 114a-b to limit the number of API calls that can be placed per minute. In particular, the system 100 can provide a mechanism for performing instruction counting, in which a callback is installed in a script engine, and calls are made to increment an instruction counter unless a predetermined maximum number of instruction calls are expended. If the maximum instruction call level is reached, the system 100 throws an error message and may terminate the execution of the service.

At a general level, the security layers 110a-b, logging layers 112a-b, and quota enforcing layers 114a-b can be applied in layers to the underlying programmatic objects 106a and 106b in a consistent and unified way. Because quotas and security are applied uniformly, and are not ad-hoc across services, in such an example, the chance of a programmer error (and resultant security breach) can be reduced. In some implementations, the layers 110-114 (e.g., wrappers) may all use shared code to call a Java client that may be located on a server.

The security layers 110a-b can protect the end user in various ways, such as from attacks from Trojan horses, phishing attacks, or other malicious code. In some implementations, the security layer 110a can be constructed after delivering a dialog box to the user. In such an example, a message included in the dialog box can identify a macro as a potentially un-trusted macro, and can further identify what can happen if the macro is executed. For example, macros can attempt to seize control of various aspects of a computer, such as by inserting malicious code into files or executing code to perform malicious acts.

A dialog box that is presented to a user can, in some implementations, identify a list of potentially harmful acts that are specific to that macro, the list being based upon a scan of the macro. Scanning a macro can, for example, help to identify specific potential harmful effects, based in part on text strings in the macro or other information that corresponds to contents of past macros that have been malicious. The user can approve or disapprove the access that the macro can have. The user's approval can be used to construct capability-based security layers like those discussed above, such as allowing the macro to have read privileges, but not allowing the macro to update certain files. In such an instance, the privileges or rights granted to the macro by the user and reflected in the security layer can be limited to those types of actions that the user has approved.

In some implementations, a process for generating security layers can detect malicious code that tries to mislead mechanisms for detecting malicious code. For example, instead of coding "delete" in a macro, substrings "de" and "lete" can be concatenated in an attempt to hide the true delete operation's intent (e.g., "delete").

In operation, the service interface 102 can wrap key methods of the various programmatic wrapped objects with a quota enforcing layers 114a-b that may execute calls to a quota server. The quota server can store configuration files, wrappers, log files, and other wrapper information. The quota server can permit configuration of both short and long term quota limits. For example, the service interface 102 can enforce a maximum number of invocations during a particular time period, such as one day, several hours, or an entire period of a user's registration with a system. Such an approach can permit bursts of activity to occur, but can prevent a wayward script from using up a user's entire quota for a day in a short time period.

In some implementations, users are identified to the quota server via an obfuscated user ID—with the obfuscation performed by the identification server's obfuscator and a program-specific key). The quota server allows for per-user overrides, so a particular user may request and be granted additional capacity. The quota limit may be applied to the triggering user rather than to an executing macro or the macro owner, because a given macro (e.g., a document approval system) may have hundreds or even thousands of users.

In some implementations, the service interface 102 may apply different quota configurations for different specific customers. For example, if a user is a member of a particular web client service, the user may be granted higher quotas than a non-member when using that service. Also, users from particular domains may be granted higher quotas than users form other domains. Also, each user may have, in combination with the above, different quota levels for different macros. For example, a particular user may be assigned a "base" level relative to a baseline, e.g., a user may be rated a 50 on a baseline of 100, meaning that the user receives half the quota of an average user. A particular macro can have a similar assignment relative to a baseline or an absolute assignment. For example, a macro could be assigned a baseline of 40 executions per day, so that the user listed above would be able to execute it 20 times each day (50/100, or 0.5, times 40).

In one particular example, the system 100 can provide a quota enforcing layer that limits the number of emails sent per day. Similarly, the quota enforcing layers 114a-b can limit the number of calendar events that a particular user can create by blocking "create event" calls after a predetermined threshold has been met. In yet another example, the system 100 can count memory object allocations to further throttle memory usage and prevent malicious or poorly constructed macros from allocating too many large memory objects. Other quota enforcing rules can also be implemented by system 100.

In some implementations, the wrappers 110a-114b protect a service provider as well. For example, the service interface 102 can include a class shutter interface to prevent scripts from accessing prohibited Java objects. In particular, the service interface 102 can employ the class shutter interface to filter Java classes that are visible to scripts and macros. In such an example, the class shutter is passed a qualified class name of any class that user code attempts to load, implicitly or explicitly. The class shutter interface generally returns a Boolean value that is true if and only if the Java class or Java object with a given name is authorized to be exposed to the scripts or macros. Furthermore, the service interface 102 limits Java classes that are made available to a scripting engine, security wrappers 110, logging layers 112, quota enforcing layers 114, beans, and the Java primitive classes such as a string, a float, and the like. This may prevent a user from accessing environment variables, or other java objects.

In some implementations, the class shutter may be pessimistic in nature, and may operate by using only a predefined white list of classes and data content. For example, any class that is not explicitly on the white list can be denied, and wildcards may not be used. The white list may include programmatic beans, Java primitives, or other approved data content.

The access methods 108a and 108b represent an API for programmers to use in transferring data to and from a service or application. The access methods 108a-b may include communication protocols that the macros 104a-d can hook into to readily access a number of applications and services. The applications can vary widely, and can include email, productivity applications such as spreadsheets and word processors, mapping applications, and combinations of various applications that can be presented together on a single web page. The applications may be accessed or developed by a user to provide customized output from a macro 104.

The system 100 may be accessed from standard web browsers. In some implementations, the access methods 108a and 108b can deny service or access to a particular user. For example, the access method 108a may deny access to the Java object 106a if a quota maximum is expended.

The hosted computer system 100 also includes program applications 116 and 118. The applications 116 and 118 can include any applications that the user (e.g., via a macro) may cause to run or execute, such as email applications, spreadsheet applications, word processing applications, photo sharing applications, presentation packages, financial planning applications, or a combination of applications. In some instances, a user can start an application explicitly by selecting the application to run, such as by double-clicking on the application name on a desktop or in a pull-down list of applications. Other applications can be started implicitly, such as when a user clicks on an email attachment (e.g., a text file or a spreadsheet), or when a user clicks on an unknown file, either of which can automatically start execution of the corresponding application that is associated with the file, such as based on the extension name of the file or other defined association. Applications can also be started if they are called by an executing macro that a user may have started running. In yet another example of starting or executing applications, an event can occur independent of a user's actions or current status on the system 100, such as the receipt of an email message in the user's account, which can start or resume the execution of certain applications. For example, the event (e.g., a received email message) can trigger a macro (e.g., to update a spreadsheet, add a subject line).

The hosted computer system 100 also includes services such as SOAP services 120, such as services made available from third-parties over the internet for passing information to requesters of such services. The service interface 102 can provide access to SOAP services 120 via a network 122. The SOAP services are platform independent web services that can be used to exchange structured data. The framework for the SOAP services 120 can form the foundation layer of a web services protocol stack, providing a basic messaging framework upon which web services can be built. The SOAP service architecture generally consist of several layers of specifications for message format, message exchange patterns (MEP), underlying transport protocol bindings, message processing models, and protocol extensibility.

The service interface 102 can access SOAP services or other third party services by abstracting out one or more layers of service specifications such that a user can access the services without knowledge about the specifications in the service. In particular, the service interface 102 provides SOAP services 120 by creating virtual SOAP services 124 that hook into the original services 120. In one example, the hook may be in the form of a dynamic proxy object 126 housed in the virtual SOAP service 124. The dynamic proxy object 126 may be provided in a "java.lang.reflect" package, for example. In particular, the package may provide an array class that contains static methods for creating and manipulating array objects and a proxy class that supports dynamic creation of proxy classes that implement specified interfaces. The implementation of a proxy class is provided by a supplied object that implements an "InvocationHandler" interface. The "InvocationHandler" interface may invoke an object or method using parameters—the first parameter is the dynamic proxy object 128, the second parameter is a method object representing the method from the interface implemented by the proxy, and the third parameter is the array of parameters passed to the interface method. An invoke method returns an object result that contains the result returned to the code that called the proxy interface method.

The service interface 102 can create the virtual SOAP services 124 using the description of the service. The description can be accessed readily since web services are typically public services available on the web that often provide this description of the service in a machine-readable way. The service interface 102 can use these descriptions to create the virtual SOAP service 124. The system 100 can create the dynamic SOAP service API by using Java reflection and dynamic proxies to create an illusion of concrete programming objects. Other methods may also be used to achieve this end, such as by using Java bytecode generation, or using features of a different programming language.

The SOAP service 120 is generally defined by a web service description language (WSDL). The system 100 can create a SOAP bean that takes a WSDL, and returns a Javascript object that is populated with the top level methods for that service. In addition, the system 100 can provide methods that will produce simple documentation on the service including which objects the service takes, what fields to populate, etc.

As a specific example, the National Weather Service (NWS) provides a web service for obtaining details on the weather. A user can, through the system 100, address the well-known, published URL for the NWS and receive access to personal weather updates using such a service. The result is a dynamically-generated programmatic object (e.g., Java object 106a) that the user can use to make calls to in their script. Particularly, the user could create an NWS bean that contacts the NWS's SOAP API using the following pseudo-code:

```
var service = SoapApp.getWsdl('http://www.weather.gov/WeatherService.wsdl');
var weather = service.getCurrentWeather({zipCode: '10003'});
var temp = weather.temperature;
```

In the above example, the system can use both the dynamic proxy object 126 and a Javascript-object-to-map-of-attributes script to move between Javascript and Java implementations. Since XML and Javascript are not typically typed, the system 100 can bypass the generation of Java classes altogether. Particularly, the system 100 can use the WSDL to generate a "grammar" of what object types have particular types of fields, and which methods take which arguments and return specific value types. Thus, the third party service object or the SOAP bean, in effect, becomes a machine for turning a WSDL (e.g., obtained via fastnet) into an object graph. The system 100 can then create function calls that result in http/fastnet requests to the SOAP service 120 or other third party service. The system 100 can marshal between XML (which SOAP calls expect) and maps of attributes (which Javascript code provides and receives).

Command mapping can be used to generate commands to be sent to various services or applications from a common macro language used by users in generating macros. For example, rules may be defined for taking a command or group of commands in the macro language and translating them into a target language (and vice-versa with data or commands). Where multiple different services or applications are used, multiple different rule sets or other command mapping mechanisms can be used, where each service or application can have a map assigned to it for translating between it and the macro language.

In certain instances, the system 100 could support multiple macro languages. In such a situation, mapping mechanisms may be provided between each macro language and each service or application language. Alternatively, commands and other data may be converted to an intermediate, generic form before being converted again to the next component. Such an approach may be beneficial when there are many macro languages (M( and many services or applications (N), so that there need only be M+N translators rather than M×N translators.

In general, the macro server sub-system combined with the service interface 102 (associated with the hosted computing system 100) can allow a user who writes macro code to write macros in a unified and consistent way, by providing an abstracted version of a service or application. The abstracted version of the service or application is generally defined by its description. The description can be used to create a virtual service that is accessible to multiple users immediately upon calling the service using one or more macros 104. This provides the end user a simple method of programming and invoking service or application functionality.

Figure 2:
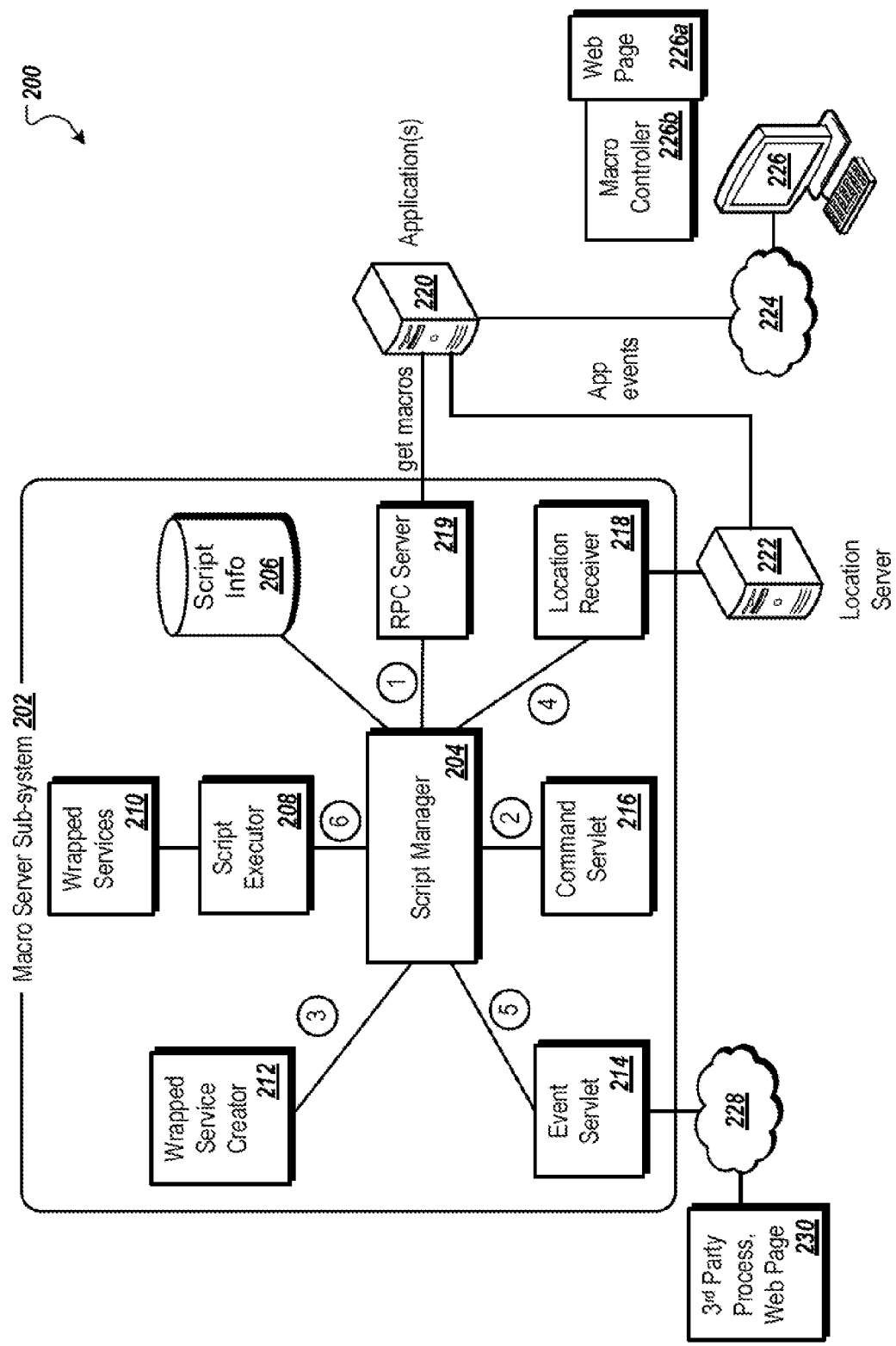
FIG. 2 is a schematic diagram of a hosted computer system capable of operating shared macros.

FIG. 2 is a schematic diagram of a hosted computer system 200 capable of operating shared macros. In general, the system 200 provides various components that show one example of a manner in which macros can be created by users, saved, shared, accessed, and executed on a hosted system.

In this system 200, a macro server sub-system 202 provides a location for saving macro code in a persistent manner in a script information storage data store 206, where the saved information may include a macro library name, script contents, and an identifier of a macro owner (e.g., using an obfuscated user ID or other identifier). When a macro is run, a command may be sent to the macro server sub-system 202 to execute the given macro. The code may then be retrieved from the script information storage data store 206, and an instance may be created in a script engine, or script executor 208.

Java objects representing the programmatic API for different server-side applications can be constructed, and can be wrapped in a capability-based security wrapper, and become programmer-visible wrapped services (or "beans"). The wrapped services 210 may include all of the relevant services that the macro server sub-system 202 may serve, for example, to consumers of wrapped services related to macro execution. A wrapped service 210 may be any relevant object that is a collection of other objects, packaged so that they may be passed around easily.

The wrapped services may include a Java business delegate that exposes public methods that interact with backend services. The public methods may be included in packages or other mechanisms for packaging methods, classes, strings, spreadsheets, application programming interfaces (APIs), and other tools provided by various computer languages (e.g., Java, etc.). The public methods may expose (or make public) resources, for example, that may be used to define and execute macros. Certain details of implementation of the public methods may be held private, which may provide suitable levels of information hiding and abstraction. The public methods may look similar across several different types of objects, exposing a somewhat consistent look and feel to macro users, and thus providing a level of polymorphism. As a result, the collection of wrapped services may facilitate the use of macros by users in an object-oriented, event-driven environment.

These wrapped services, or beans, are attached in this example system 200 to a top-level Java object that has public members for each property (e.g., spreadsheets, calendars, etc.) This top-level Java object is inserted into the scope for the environment of the script executor with a standard and predetermined label. In some implementations, the script executor reflects public members (and only public members) to the scripting environment.

Therefore, when a user's JavaScript code executes var doc=google.spreadsheets.create("my new doc"); (1)

the "create" Java method on the Java object in the "spreadsheets" field of the top-level object is called. The Java implementation of this method makes a remote procedure call to the spreadsheet server, with a "CREATE" command and an argument corresponding to the new title (e.g., "my new doc"), along with an obfuscated identifier of the script runner. The spreadsheet server creates the new spreadsheet and returns its key in the response to the remote procedure call. The macro server creates a new Java object representing the newly created spreadsheet, containing the new key. The Java object includes methods for several spreadsheet operations, such as "rename", "insertSheet" and so on. That object is also wrapped in a capability-based security wrapper and returned. The script executor internally wraps this object into a Native-JavaObject wrapper, and returns it to the variable "doc" above.

In some implementations of wrapping objects, any appropriate service (e.g., spreadsheets, calendar, email, etc.) may return objects that are wrapped in Java dynamic proxies. Distinct proxies may exist, such as for security, logging, and quota. Each proxy may incorporate or use a description of what service it is exposing (e.g., a Java interface, such as "Spreadsheet", "SpreadsheetRange", "EmailService", etc.) which may define the public methods. Annotations may exist on the interfaces, appropriate for the different wrappers.

For example, the "create" method on the spreadsheet service may create a new spreadsheet. It may have one annotation that declares that the method is a WRITE method, providing a mechanism, for example, to warn the user that the script will attempt to write to their collection of spreadsheet documents (and the script will fail at runtime if the user has not authorized a WRITE privilege for the script). Basically, the security wrapper helps to ensure that a given method's declared required permissions (WRITE, etc.) are in the user's authorization token. If the method is authorized, it passes the call to the next layer.

Security may also be provided by limiting the number of times a particular user can access an operation with respect to a macro. To perform such functionality, a quota annotation can exist on the "create" method, saying that calls to this method should be counted against the end user's "create spreadsheet" quota. The quota wrapper may call or use a quota service that keeps track of how many times a given user causes an operation to be performed. The method may fail, for example, if the user is over quota; if not, it again passes it down to the next layer. The quota for a user may be measured across a set time period, such as a day, a week, or a month, and may reset or decrement at periodic points in time.

A transcript of the macro executions may also be provided by a logging layer that records a string version of each method called, and the arguments provided.

The wrapped service creator 212 may create top-level wrapped services, the extent of which depend on the macro and its environment. For example, the wrapped service creator 212 may examine the capabilities that the end user who is running the macro has explicitly granted the macro, and may create top level beans corresponding to the state of the macro. The state may include, for example, the current document (e.g., email, text document, drawings, spreadsheet, etc.), if any, and user authentication. The wrapped service creator 212 may generate top-level wrapped services, having a capability that is based on the environment, and may inject the wrapped services 210 into the script executor's 208 execution environment where the user can, for example, define and execute macros. In a sense, the wrapped service creator 212 may be thought of as a producer or factory for beans, or a "bean factory."

The types of wrapped services 210 that may be created include, for example, capability-wrapped instances of spreadsheet applications, calendar applications and so on. This Java object may be inserted into the execution scope. The source of the object may be used to identify it (e.g., with the label "TopLevel"). Hence, "TopLevel.spreadsheets", for example, may become a reference to the capability-wrapped object (e.g., the SpreadsheetApplicationApi object). The object's public methods may be reflected as Java objects into the JavaScript programming environment and may be made available for macros.

For example, JavaScript code such as:

```
var doc = google.spreadsheets.getActiveSpreadsheet( );
var otherDoc = google.spreadsheets.openByName("MyOtherDoc ");
var value = doc.find("A1").getValue( );
otherDoc.find("B2").setValue(value);                          (3)
``` may open an existing spreadsheet (e.g., a spreadsheet called "MyOtherDoc ") and copy the value of cell A1 from the current spreadsheet to cell B2 of the new spreadsheet. Java objects such as a Range object returned by a "find" method are capability wrapped, as are all others, and may fail if the authenticated user does not have access to the relevant spreadsheet. For example, in the copy/paste cell example previously presented, accesses required for successful execution are read access (e.g., required by getValue) on the active spreadsheet, and write access (e.g., required by setValue) on the target spreadsheet (e.g., the spreadsheet "MyOtherDoc").

The script executor 208 may be responsible for creating a context for the macro and performing the actual insertion of the top-level wrapped service 210. A new top level scope may be created for each macro execution, such as to prevent the possibility of one executing script "poisoning" the global scope for other scripts. The macro context may be loaded with an implementation of a class shutter or filter, which prevents the creation of any Java classes that are not approved (e.g., not on the white-list of allowable classes). Additionally, the script executor 208 may create an instruction counter for throttling runaway scripts, such as to detect when a script has entered an infinite loop. In some implementations, runaway scripts may be terminated prematurely by the script manager 204.

The script executor 208 may be responsible for various functions, including parsing, checking syntax, function calls, macro execution and resumption. The parse function may examine a script and return a list of functions and macros discovered in the script storage in a data store, such as the script information data store 206. For example, referring to FIG. 1, the functions and macros detected as a result of the parse function may include the get name function 114, the check name function 116, the get location function 118, or any other functions, macros, etc. that may be embedded in the script or macro code (e.g., macro code 112).

Other functions supported by the system may also be used to help manage a collection of macros on a server-side system 200. For example, a syntax checking function can, before storing a script, determine if there are errors in the script (e.g., syntactical errors, language-compilation errors, misuse of keywords, etc.) in it. If syntactical or other errors are detected, the errors may be communicated, alerting the user or script programmer.

A call function may "call" (or start the execution of) a function in a macro. This call function may be a limited version of executing the macro, such as a version that has privileges granted for in-cell (e.g., in a spreadsheet) function calls. For example, limited versions of macros may be limited to only returning a value, while not be allowed to create side effects.

Macro execution and resumption functions may be used to start and resume macros. For example, the macro execution function may start the initial execution of the macro. In some cases, execution of the macro may require additional input from the user. In this case, execution of the macro may suspend, or enter a wait state, pending input from the user. Once the user input has been provided, the resume macro function may continue the execution of a macro that had been halted.

The script information repository 206 may serve as a data store, providing and/or supporting operations such as script/macro creation, storage, retrieval, update, deletion, etc. Scripts stored in the script information repository 206 may be organized by user library, individual script, or application (e.g., applications for email, spreadsheets, word processing documents, etc.). Operations may be performed on an entire user's library, or on individual elements in the library. For example, one operation may retrieve a user library by its ID (e.g., a primary key lookup based on the name of the library). Another operation may retrieve all user libraries linked to a given document, such as a document representing a macro or script.

Retrieval operations provided by the script information repository 206 may include operations that retrieve the authorization for a given user on a given user library, retrieve all user libraries owned by a given user, retrieve a continuation record by its ID, etc.

Creation/update operations provided by the script information repository 206 may include an operation to create/update a user library, an operation to create an association from a library to an abstract object's key (e.g., a document ID), an operation to create/update the authorizations for a given user on a given library, an operation to create a new continuation record (e.g., with serialized binary data, for a given user) and library and other creation/update operations.

Operations provided by the script information repository 206 that perform deletions may include an operation that deletes a continuation record, an operation that deletes an association from a library to an abstract object, and an operation that deletes a library, removing all child objects, including child objects associated with authorization and link continuation. An example logical structure of the script information repository 206 is described below with respect to FIG. 5.

The script manager 204 may delegate commands to the underlying components 206 through 219 of the macro server sub-system 202. Descriptions of specific example commands follow, and the delegation control paths to the underlying components 206 through 219 are marked with a series of lettered process arrows 1 through 6, which are generally lettered chronologically, though certain actions may occur in another order where possible.

One command that the script manager 204 may perform (e.g., by delegation) is to store a user library. The command may be limited in its execution, for example, based on the user privileges or other security. For example, if the user library representation (e.g., a protobuffer or protocol buffer) contains a library ID, the script manager 204 may ensure that the executing user is allowed to modify the library. If authorization occurs, then the script manager 204 may write it to the storage layer and return the new representation of the library. If no ID is present, a new ID may be created, and the representation containing the newly generated ID may be returned. Storing a library may involve, for example, parsing the functions in the library (e.g., using the script executor 208), adding the functions to the library DAO object, detecting syntax errors (e.g., using the script executor 208), storing the library content, and storing the owner. Referring to FIG. 2, the components involved in storing a user library may be indicated, for example, by process arrows 1, 2, and 6.

Protocol buffers, for example, when used for the user library representation, may include a data structure which can be serialized over the wire or persisted in binary form in a database. The data structure can use strongly typed fields in order to enforce communication protocols.

Another command that the script manager 204 may perform is importing a library. This command may create a link or other association of a library to a given document (e.g., a spreadsheet, an email calendar, or any other attachable context). For example, an email message may be associated with the user's given mail account. The purpose of the link is so that the underlying document may quickly discern which macros are associated with it, to display in "Run" menus, for example. For example, a library importing command may create a "Link" table entry in the data store. Referring to FIG. 2, the components involved in importing a library may be indicated, for example, by process arrows 1 and 2.

The copy command, which is another command that the script manager 204 may perform, copies an existing library, making a duplicate of its contents. For example, all of the scripts and macros contained in the library can be copied to a new library name. While the act of copying makes a duplicate of the library's contents, the associations are not copied. The newly created library's owner is set to the current owner. Upon completion of the copy operation, the ID of the new library is returned. For example, the copy command may create a new "UserLibrary" table entry in the data store, without copying over any links, continuations or authorizations. Referring to FIG. 2, the components involved in copying a library may be indicated, for example, by process arrows 1 and 2.

A delete library command can, for example, check for permission, then if allowed, it may delete the library from the data store (e.g., in the script information 206). For example, the delete library command may remove the entry from the "UserLibrary" table and all child tables. The front end may be responsible, for instance, to do any "are you sure?" interrogations. The components involved in deleting a library may be indicated, for example, by process arrows 1 and 2.

A command to get libraries by a user may return the libraries owned by a given user, based on the ID of the user. For example, the command may return the user library (e.g., in a UserLibrary or other table) entries stored in the script information 206 where the owner field is the current user. Referring to FIG. 2, the components involved in obtaining libraries for a user may be indicated, for example, by process arrows 1, 2 and 4.

A command to get libraries by document may return any libraries imported by a given document. For example, the get libraries command may scan the Link table for "documented" fields that match, and return the parent "UserLibrary." Referring to FIG. 2, the components involved in obtaining libraries for a document may be indicated, for example, by process arrows 1, 2 and 4.

A categorize library command may add an association to a "virtual" document, such as "SAMPLES.". For example, the categorize library command may create an entry in the Link table with the given name (SAMPLES, etc.). Referring to FIG. 2, the components involved in categorizing a library may be indicated, for example, by process arrows 1 and 2.

A get libraries for category command may return all libraries with a given categorization. For example, the get libraries for category command may be similar to getting libraries for a document. Referring to FIG. 2, the components involved in searching libraries by category may be indicated, for example, by process arrows 1 and 2.

An evaluate function command may retrieve the function from the library and pass it to the script executor 208 for execution. Referring to FIG. 2, the components involved in evaluating a function may be indicated, for example, by process arrows 1, 2, 3, 5 and 6.

An evaluate macro command, when provided input parameters (e.g., library ID, macro name, and contextual information about the current document, if any), may create the programmatic beans with wrappers and pass wrapped services to the script executor 208 for execution. Referring to FIG. 2, the components involved in evaluating a macro may be indicated, for example, by process arrows 1, 2, 3, 5 and 6.

A continue macro command, when given a macro library ID and continuation ID, may invoke a continuation operation on the script executor 208. For example, such a command may cause a paused executing macro to continue actively executing. Referring to FIG. 2, the components involved in continuing a macro may be indicated, for example, by process arrows 1, 2, 3 and 6.

An update authorizations command can, for a set of authorizations for a given user and a given macro library, update (or add) an entry in the data store. Referring to FIG. 2, the components involved in updating authorizations may be indicated, for example, by process arrows 1 and 2. In some implementations, "get library" and other commands may typically act only on the script storage layer, and not invoke the script executor 208.

Referring now to another component of the system 200, the command servlet 216 may cause macro commands to be executed by responding to requests from a macro controller (e.g., the JavaScript macro controller "MacroController.js"). The response may occur as a redirection, such as a redirection that is transparent and automatic to a user. In one example redirection technique, at the time a browser client make requests to a specific URL, a redirection rule may direct the request to the macro server, such as the macro server sub-system 202. The types of requests that the command servlet 216 may handle include, for example, several requests with names such as, GET_ADMIN_PANEL, SET_SCRIPT, etc.

For example, a GET_ADMIN_PANEL request may return the full HTML of the macro admin panel, and the macro controller (e.g., MacroController.js) may insert the HTML into a closure dialog. A SET_SCRIPT request may send the script content and user library ID to the command servlet 216. The command servlet 216 may invoke the script manager 204 to create/update the user library, which may result in returning the HTML (e.g., generated by a GXP) for the left hand side of the panel (containing the categories and library names). The macrocontroller.js may render that HTML in the div for the left hand side panel.

A GET_SCRIPT request may fetch the script content for the given library from the Script Manager, and may return a content pane (generated via GXP) for editing that script. The macrocontroller.js may put that HTML into the content div of the panel.

An IMPORT_LIB request may invoke the ScriptManager with an import library command. The request may render the left hand side of the panel via gxp and return it to the macrocontroller.js.

A COPY_LIB request may be similar to the IMPORT_LIB command, but uses a copy command rather than an import command. A DELETE_LIB request may be similar to the IMPORT_LIB, but may use the delete command, for example, so as to return the entire admin panel HTML via gxp. A CATEGORIZE_LIB request may be used as an "add to samples" feature. Like import_lib, CATEGORIZE_LIB may invoke the Script Manager with the categorize lib command and returns the left hand side of the panel for redrawing.

A RUN_MACRO request may take a macro name, library id, and serialized representation of the state of the document (e.g., current selection, etc), and invoke the script executor 208 to execute the given macro. If an error occurs, an error message is thrown back to macrocontroller.js for display to the user. If the user has to authorize the macro, a message may be sent back to the macrocontroller.js to prompt the user.

The macro server sub-system 202 interacts with applications 220 and a location server 222 through a network 224. The applications 220 may be applications being executed by a user employing a user device 226, such as a web browser running on the user's laptop computer. The user device 226 may display, for example, a web page 226a (e.g., using a spreadsheet server). The user's web browser may employ a macro controller 226b in order to control the execution of macros on the user's user device 226.

External events from third-party processes and web pages 228 may serve as the triggering mechanisms for macros that are defined within the macro server sub-system 202. The external events may be received via a network 230, such as the Internet. The external events here may correspond to the external events 105 described with respect to FIG. 1.

The systems here may also permit a user to record a macro by instantiating a macro recorder, carrying out a number of actions that are tracked by the macro recorder, and saving a representation of those actions that the user can later invoke for automatic execution of the actions. Macro recording may be performed typically on the server side in this implementation. When a user executes a recordable command (e.g., setting a cell value, inserting a sheet, etc.), a command may be sent to the spreadsheet server. That server may note whether or not it is in "record" mode, and if so, may look up the command and write text into a running string buffer that corresponds to the scripting code that would have the same effect.

For example, consider if the user types "hello" into cell A1 of a spreadsheet. A command may be sent to the spreadsheet server, with a command ID that means "set range", a value of "hello", a row of 0, a column of 0, and a sheet-ID of 0 (e.g., if it is the first sheet). Note that this is not just for the recorder; this is the command that actually performs the change to the cell on the spreadsheet server, so this command is sent whether recording is occurring or not. The recorder thus may be essentially the equivalent of a wiretap on the existing command flow that makes the spreadsheet operate.

The recorder may look up the command ID and see that it is a "set range" command. Knowing that the appropriate code to generate is a "setValue" call on a "range" object, the recorder may look up and use the row and column to generate the corresponding text. The recorder may then look up and use the sheet identifier, determining if a variable for that sheet already exists. As a result, the macro recorder may generate text such as:

$$sheet.getRange('a1').setValue('hello'); \quad (2)$$

Thus, by these structures, a computer user may log onto a hosted computer service and access a number of different applications and services. The user may explicitly choose to execute a macro, or the macro may be automatically triggered, and the macro may run in the application and other relevant applications that may be automatically instantiated if they are referenced by the macro. As a result, the user may have access to a wide variety of data and programming mechanisms to produce robust on-line services.

Figure 3A:
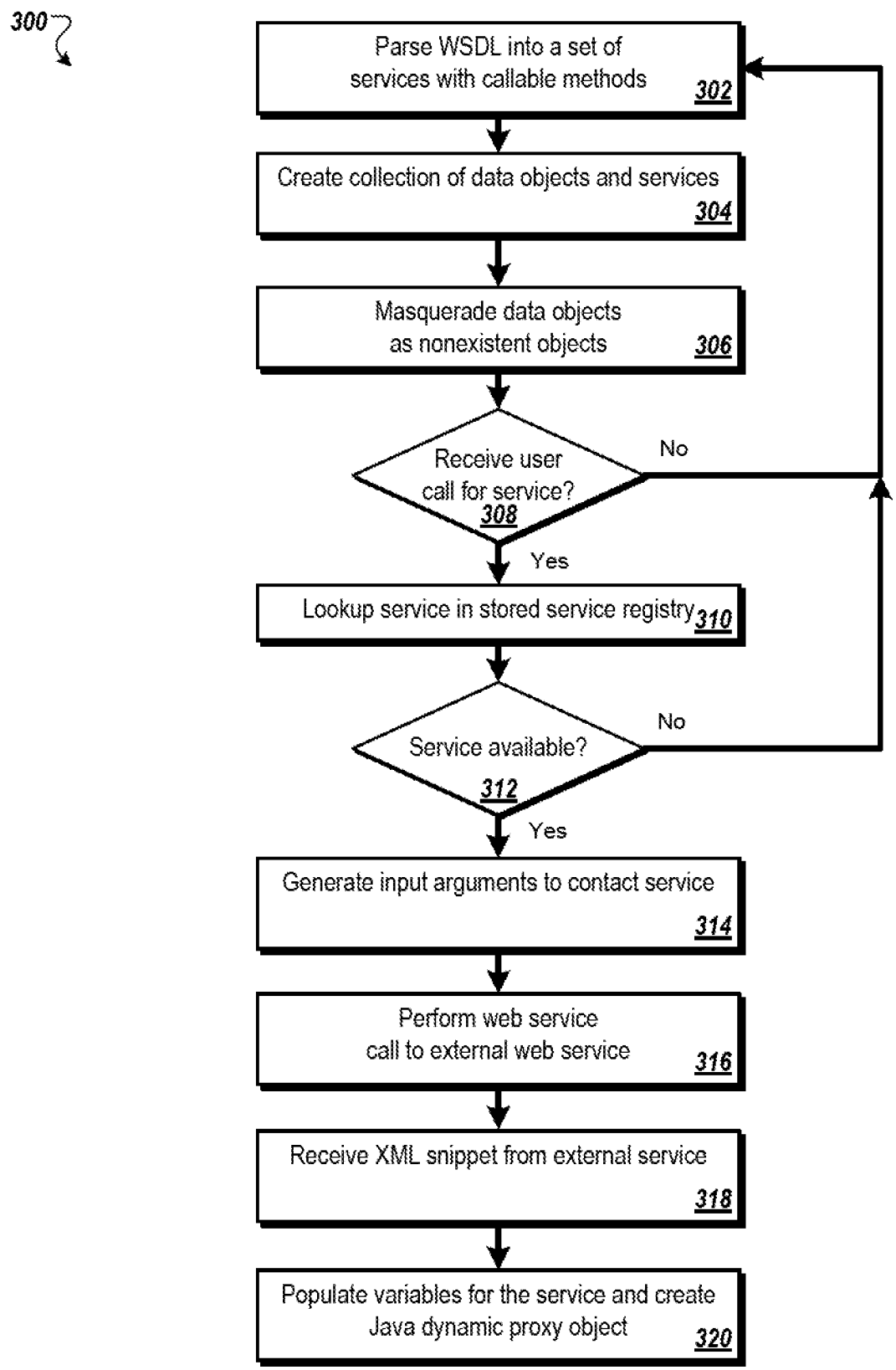
FIG. 3A is a flow chart of a process for providing a third party data object to a user.

FIG. 3A is a flow chart of a process 300 for providing a third party data object to a user. The process 300 may be performed in systems 100 or 200 over network 122 or 228, for example. In general, the process 300 involves processing of user requests in a macro language for services from third-party web services, where those services are be communicated with using one or more other languages or protocols.

The process 300 in this example begins at box 302, where a system such as system 100 in FIG. 1, parses WSDL into a set of services that have callable methods, and data objects that have attributes. In step 304, the system 100 can use the parsed WSDL to create Java objects and/or services that can be accessed in an automated fashion. For example, a user can create a macro to hook into the created Java objects by making a simple function call for a particular service. In the NWS weather example described above, the user need only know that the weather service has a "getCurrentWeather" method and that the method requires an object with a "zipCode" parameter, and returns a weather object with a "temperature" field. For example, a weather service may create a service object with methods like "getCurrentWeather" and "getForecast," each of which take a "regionDescription" and return a "weatherStatus" object. As the system 100 scans the WSDL, the service interface 100 can create a collection of these data objects and services for future use.

The system 100 can employ Java reflection to create a masqueraded object that can be returned to a macro running on the system 100. Java reflection is a feature of the Java programming language whereby a given object can masquerade as another object. In step 306, the system 100 masquerades the data objects as nonexistent objects, such that all calls made to this masqueraded object end up as calls with a string for the method name, and a set of objects for a related argument.

At some point, the user may request a service from the system 100, such as by explicitly running a macro or by implicitly having a macro run (e.g., by establishing an event that will trigger the execution of the macro on a server subsystem, and by the event actually occurring and being reported). The process 300 may determine whether a user call or request for service has been received, in step 308. If the system 100 determines that a call has not been received, the system 100 can continue parsing WSDL into services or methods in step 302. If the system 100 receives a service request, the system can look up the service in a stored service registry, in step 310. For example, if the user calls "service. getCurrentWeather," a "getCurrentWeather" string is provided as the method. The system 100 can then look up the "getCurrentWeather" string in a stored registry of services.

In step 312, the system 100 can determine whether the requested service is available. For example, the system can detect if the "getCurrentWeather" string is available in the registry of services. If the service is not available, the system 100 can continue parsing WSDL into services or methods in step 302. If the "getCurrentWeather" string is found in the registry of services, the system will be aware of what parameters are required to submit to the string based on the previous parsing of the WSDL and can provide the parameters required to contact the requested service. For example, the system 100 can determine that the "getCurrentWeather" string requires a "regionDescription" parameter and that it will return a "weatherStatus" string.

In step 314, the system 100 uses the parameter information to create an input argument into a form that contains all variables required in the "regionDescription" parameter. In step 316, the system 100 then performs a web service call to the actual external web service filling the payload with an XML representation of the command "getCurrentWeather" and the variables in "regionDescription", for example. The external web service returns a snippet of XML and the system 100 then recognizes that the snippet will look like a "weatherStatus" object, in step 318. Accordingly, the system 100 populates the variables for the "weatherStatus" object using information from the returned XML and turns that information into a masqueraded object as well, in step 320. For example, if the "weatherStatus" object has a "temperature" field, the system 100 can create the Java dynamic proxy object 126 that knows that requests for "temperature" should retrieve a particular value that was parsed from the XML snippet that the service returned.

Therefore, in the example process 300, the system 100 allows a user access to a third-party web service using service request content and variables required to "execute" the service. For example, the user need only provide a request for a weather service and the desired location (e.g., zip code) to receive a weather object with a temperature field that can be placed in a macro or application.

Figure 3B:
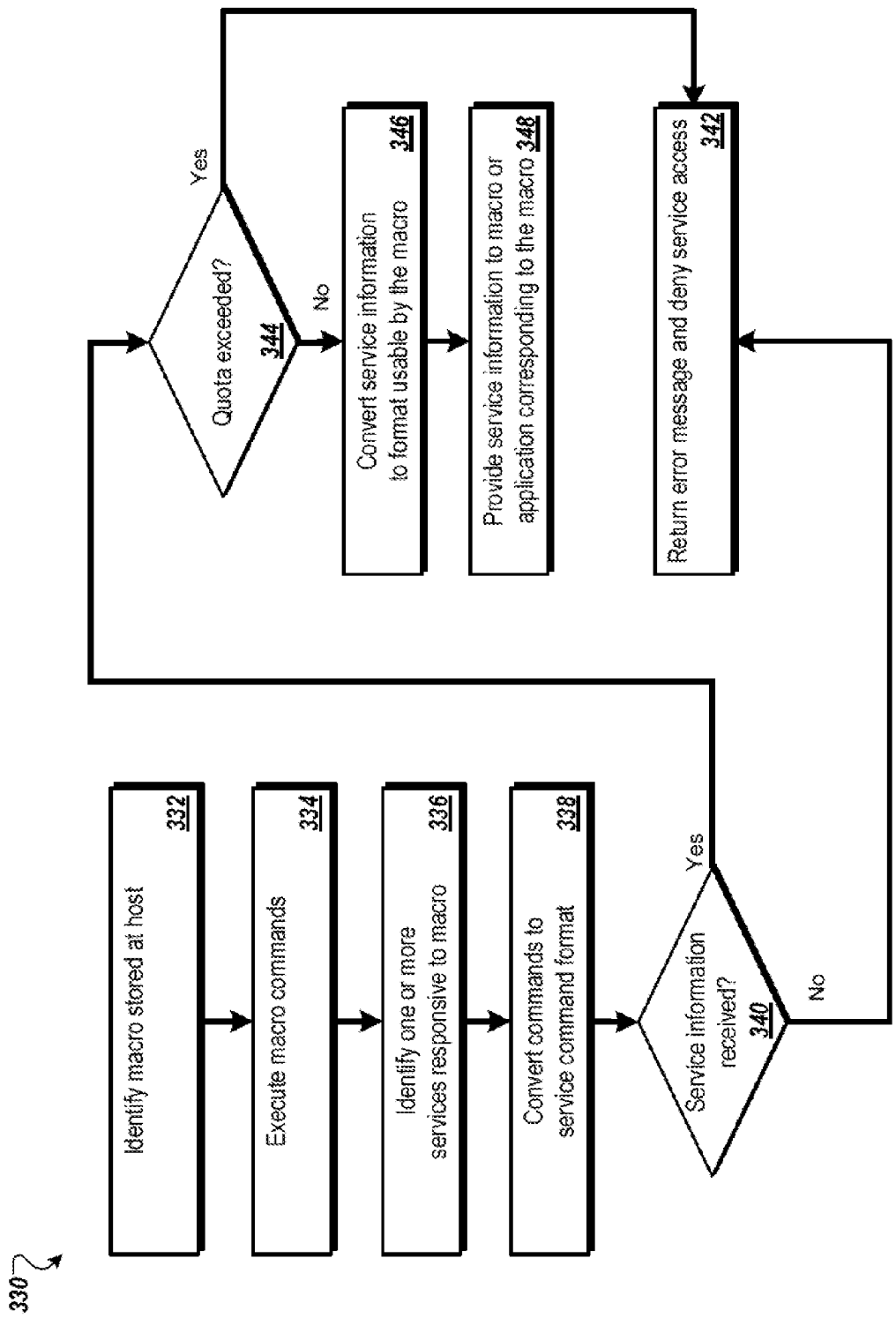
FIG. 3B is a flow chart of a process for managing computer macros.

FIG. 3B is a flow chart of a process for managing computer macros. The process 330 may be performed in systems 100 or 200 over network 122 or 228, for example. In general, the process involves identifying a macro to be executed, accessing the macro code for the macro, traversing the lines of the macro, and translating or converting commands from such code into other protocols or formats so that the macro can interact with a diverse range of services and applications.

The process 330 begins in step 332, where a macro that is stored at a hosted computer system is identified. For example, the macro can be identified from a URL that calls the macro and that includes a path and name for the macro. A user may create the macro 104a to access a weather forecast from the National Weather Service (http://www.nws.noaa.gov) each morning at a specific time, in a particular zip code and to send the weather to the user's mobile telephone.

In step 334, the system 100 can then execute the macro by traversing lines of commands in the macro. For example, the system 100 can parse and execute code that includes a link to the National Weather Service, a zip code, a cell phone number, and a particular time of day. The system 100 can register the macro in a database and identify one of a plurality of different services that are responsive to the macro 104a, in step 336. For example, the system 100 can determine that the macro 104a applies to the weather forecasting service provided by http://www.nws.noaa.gov.

In step 338, the system 100 converts one or more commands in the macro 104a from a format associated with a macro language on the system 100 to a command format associated with the identified service or services. Such conversion may occur in various manners, such as by referencing a command mapping structure that provides general outlines of mapping operations between languages, and then by adding appropriate definitions, variables, parameters, or other appropriate information to the translated commands.

In certain instances, the translated commands may call for information from one or more services internal to the system that stores and executes the macros, or from services external to such a system. Thus, in step 340, the system 100 determines whether service information has been received from a particular service provider after a request has been made to the service provider, such as in the manners discussed above. For example, the system 100 can determine whether the National Weather Service service provider has provided information that relates to the identified macro. If service information has not been received or verified within a predetermined time period, the system 100 responds with an error message and denies access to the service using the macro 104a, in step 342. If service information is received, the system 100 determines whether predetermined quotas have been exceeded, in step 344. If the quotas have been exceeded, the system 100 responds with an error message and denies access to the service, in step 342. If, however, the quotas have not been exceeded, the system 100 converts the received service information into a format usable by the macro 104a or an application that corresponds to the macro (and that will receive the information via the macro or under control of the macro), in step 346. The system can then provide the converted service information to the macro or an application corresponding to the macro, in step 348.

Figure 4A:
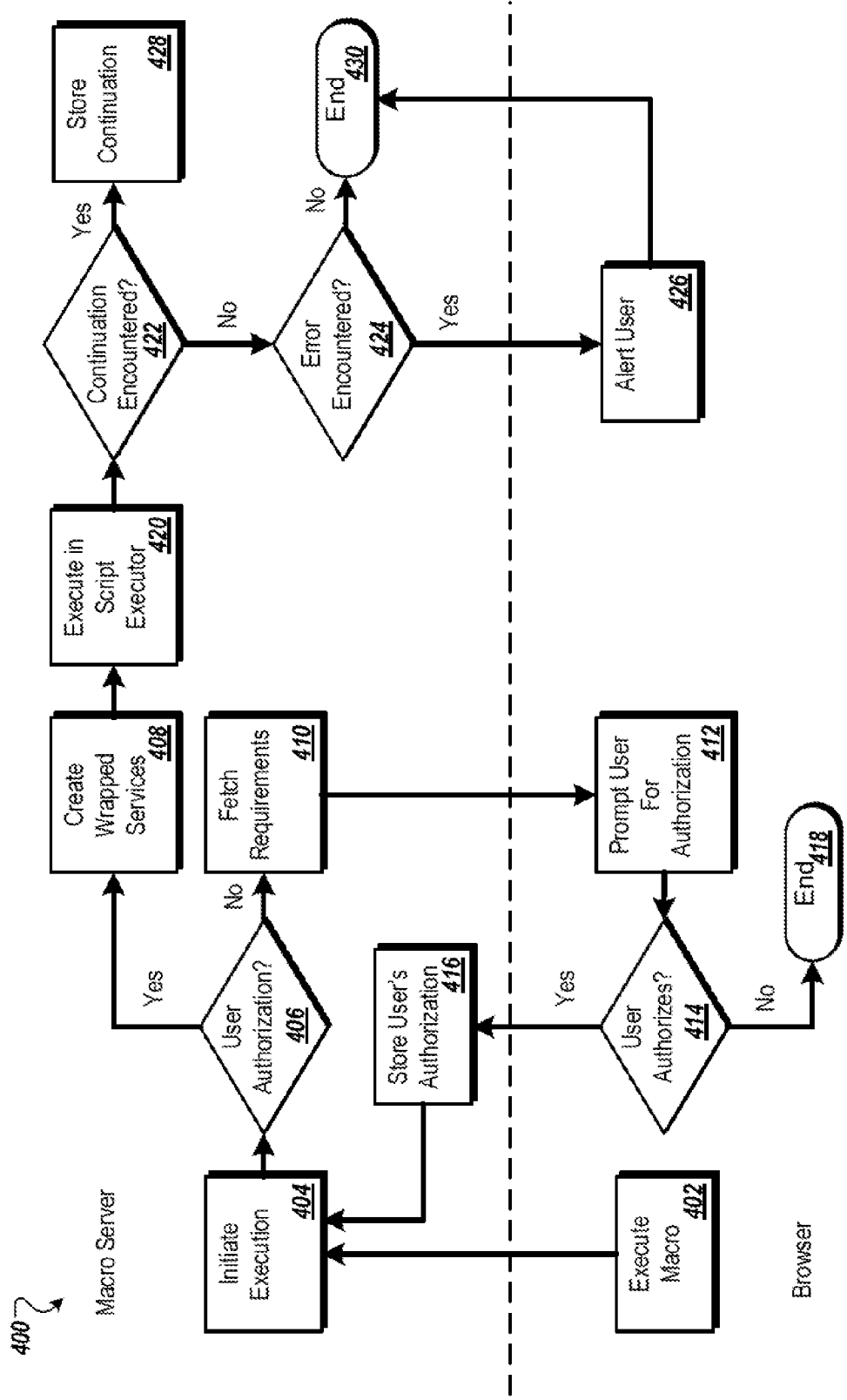
FIG. 4A is a flow chart of a process for executing a macro invoked from an application running on a web page.

FIG. 4A is a flow chart of a process 400 for executing a macro that is invoked from an application running on a web page. In general, the process includes In general, the process shown in FIG. 4A is similar to the process shown in FIG. 3A and shows examples for the manner in which the process can be shared among different components in a multi-component system.

The example process 400 includes steps corresponding to interactions between a browser 401a and a macro server 401b. For example, interactions at the browser side of the process may involve a user employing a client device that is running a spreadsheet application, while the executed macros may run at (and obtain data by) a data server system, such as the macro server 401b. The process 400 steps shown on the browser side are in addition to generic interactions, unrelated to macros, that may occur between the user and the spreadsheet application (e.g., provided by a spreadsheet server system). The process 400 steps performed on the macro server side may be performed, for example, by the macro server sub-system 202. The process 400 may also represent macro execution on the systems 100 and 200 described above with respect to FIGS. 1 and 2. In general, the steps of the process 400 in the macro server 401b side may be controlled by the script manager 204.

At box 402, a request to execute a macro occurs. For example, the request may originate by a user running a browser application on a client device. The user may execute a key combination to trigger the running of the macro, or the running may be initiated by the opening of a particular document in an application, a user selection of a control on the application, or by mechanisms apart from the user's interaction with the system, such as by an external signal being received by the sub-system.

At step 404, execution of the macro is initiated. The initiation can, for instance, occur within the macro server sub-system 202. For example, macro code corresponding to an address that may be passed or identified by the client device may be loaded on the sub-system and its execution may begin in a normal manner.

A determination is made at step 406 whether the user has provided authorization to execute the macro. Such an action may occur at the beginning of the macro code execution. For example, the user authorization may be part of a practice for preventing malicious code from running, as described above.

If user authorization does not exist, the user authorization requirements are fetched in step 410, and the user is prompted for authorization in step 412. If the user provides authorization at step 414, the user's authorization is stored at step 416; otherwise the process 400 ends at step 418. The user authorization requirements may include, for example, a list of the types of malicious results that may occur if the macro is allowed to execute. The list may be presented to the user at step 412.

If user authorization exists, wrapped services are created at step 408. The wrapped services (or "beans") may be created, for example, by the wrapped service creator 212. Such action may be optional and may be used to protect the executing code from malicious interference, as described above.

The script (or macro) is executed in the script executor in step 420. For example, referring to FIG. 2, the script may be executed by the script executor 208. The execution occurs, for example, within the macro server sub-system 202 as opposed to macro execution that occurs locally on the client. The script execution may occur in a normal manner, with a portion of the sub-system stepping through the steps in the script and carrying out their actions as each step is met. A determination is made at step 422 whether a continuation has been encountered. If so, the continuation is stored at step 428. A continuation may be used to, in effect, pause a script until a particular time or event has occurred. If no continuation is encountered, processing resumes at step 424, where a determination is made whether an error has been encountered. If no error is encountered, execution of the macro ends successfully at step 430. If an error is encountered at step 424, the user is alerted at step 426 before the macro's execution ends at step 430. Thus, by this process, a user may be provided with functionality provided by a macro that is triggered from actions by the user on a client device (or by other events), and the macro may execute on a sub-system that is separate form the client device. The execution may occur, in some instances, when the user is not on-line, and the results of the macro execution may be made available to the user and to other users who are registered with the system.

Continuations may serve as a "snapshot" of the execution state of the script interpreter, freezing execution so that execution may be resumed later. This is conceptually similar to how a breakpoint operates in a debugger, or an "alert" call in standard browser-side execution (e.g., JavaScript). Continuations may be implemented as a binary serialization of all objects in the interpreter (e.g., all local variables and "beans"), and a pointer to the current execution point. The continuations may be implemented within the script executor 208, which may enable continuations as a publicly available feature. All objects (e.g., including "beans") may be serialized by the script executor 208 using, for example, Java serialization, which is a standard feature of Java. Using Java serialization, an object (and all of its children objects) may be written out to a binary stream, which contains object identifiers and the current value of all fields. When a macro resumes, the script executor 208 may be given the continuation binary data, which may be used, for example, in de-serialization into new, live Java objects.

In some implementations, continuations may be stored in a database. Continuations are stored in a database, for example, until a macro is resumed, rather than in server memory. One reason for database storage may be because a server may restart between the time a continuation is triggered and the time the user resumes execution (e.g., by hitting an "ok" button on a dialog or some other resumption action). In some implementations, continuations may have a pre-determined lifetime (e.g., six hours), after which they may be discarded. In this way, continuations don't keep on taking up disk space, such as if the user never gets around to hitting the "ok" button.

Figure 4B:
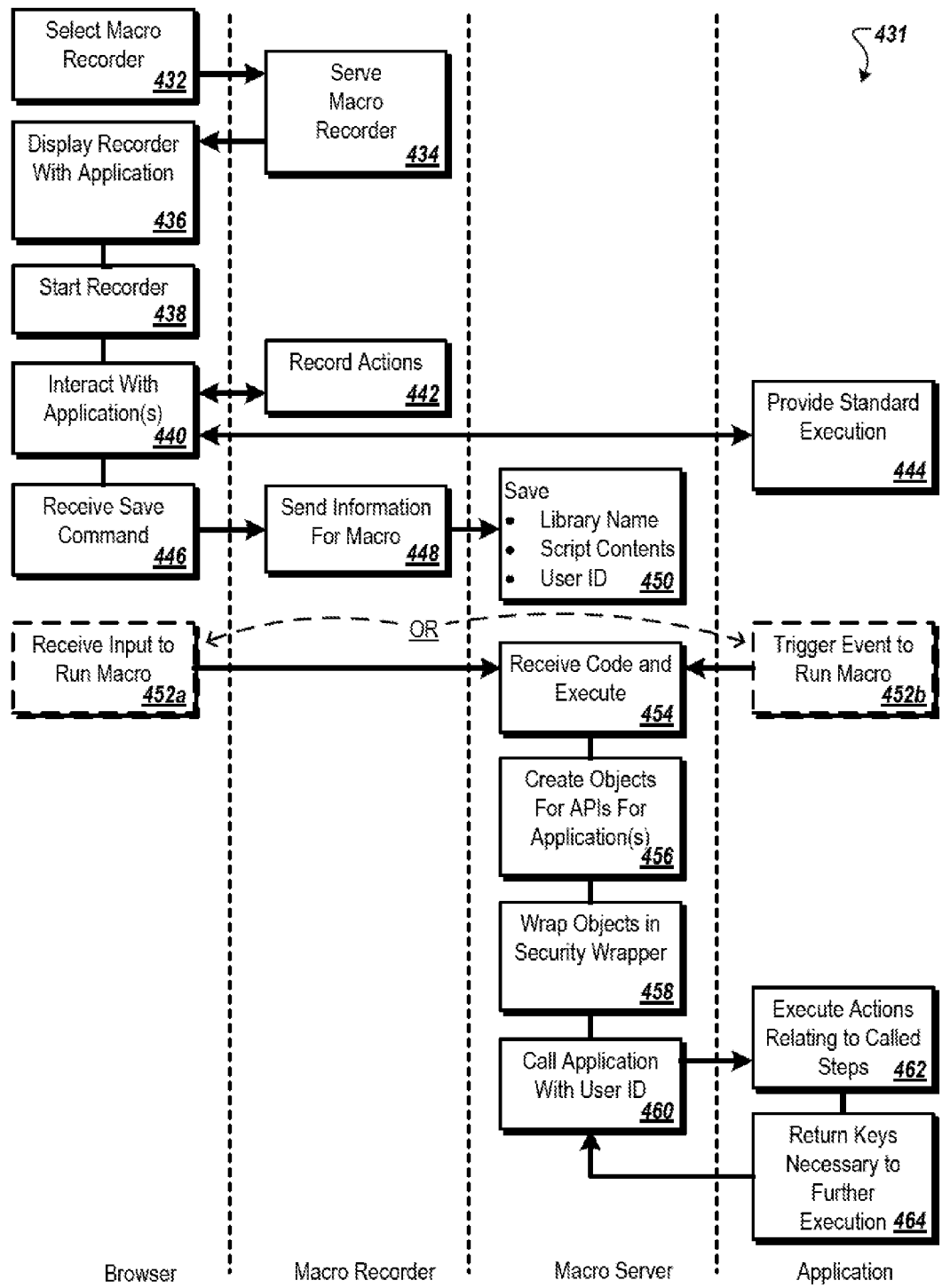
FIG. 4B is a swim lane flow chart of a process for recording and executing a macro on a hosted system.

FIG. 4B is a swim lane flow chart of a process 431 for recording and executing a macro on a hosted system. The example process 431 includes interactions among a browser, a macro recorder, a macro server and an application. In general, the process provides a set of macro recording controls to a user, from a server sub-system, whereby the user can employ the controls to indicate when actions taken by the user and the system should be recorded, and such actions may then be reformatted into code for a macro the re-executes the actions when the macro is called.

The process begins at box 432, where a macro recorder is selected by the user. The selection may occur on the browser, for example, when the user selects a control to begin recording a macro. The macro recorder is served at step 434. The macro recorder may be executing on the user's browser, or the macro recorder may execute remotely, such as at the macro server sub-system 202. The macro recorder may be displayed, for example, in a borderless browser window that is separate from a window that is currently displaying an application on the user's client device. The recorder may also be served in other manners, such as in an iFrame or similar element that is part of the same page that is displaying the application.

At step 436, the macro recorder is displayed with the application. For example, if the user is executing a spreadsheet application within his browser on his laptop computer, a popup or other display may appear and represent the macro recorder. The macro recorder may be displayed with various controls for controlling the operation of the recorder, such as record, pause, and stop buttons that a user can select. Recording is started at step 438, meaning that the user may begin keystrokes, etc. that define the macro. Such recording may be triggered by a message being sent to t server sub-system that serves the recorder via code that displays the recorder, indicating that a user has selected a record control on the recorder.

At step 440, the user interacts with the application(s), meaning that the user performs the operations (keystrokes, selections, etc.) that are to define the macro's functionality within the application(s) being used by the user. For example, the user may select a range of cells in a spreadsheet, may execute commands on those cells (e.g., to copy and paste them, to enter formulae in them, etc.), and may perform other such actions.

At step 442, during the time that the user is interacting with the application(s), the macro recorder begins to record the actions of the user, which may include displaying commands as they are recorded by the user during the recording process. As noted above, the recorder may interpret the user inputs in the same manner that the application(s) interpret them, and may then convert such interpreted actions into commands that the macro can later feed to the applications when it is run. The recorder may also track the application (e.g., browser window) within which a user executes commands, so that the macro may know to provide commands to those various different applications when it is run.

While the user is interacting with the application(s) and the actions are being recorded, standard execution of the user's actions is provided at step 444. The execution may occur within the application(s) with which the user is interacting. Thus, the actions of the user may be provided to the applications and to the macro recorder in parallel, so that the actions are recorded, and also so that the applications react to the actions in an appropriate manner.

Upon completion of defining the macro, a save command is received from the user, such as by pressing the "Done" key, a "stop" button in the recorder, or other control. At step 448, the information for the macro is sent. Such information may be interpreted into macro commands at record-time as commands are executed by a user, or may be interpreted and converted when the macro recording has stopped. The macro recorder may then send the information, for example, to a macro store, and may generate one or more pointers (e.g., URL's) to the macro code so that the code can be accessed easily at a later time. For example, the macro recorder may request the user to identify a key combination to be used to launch the macro at a later time.

At step 450, the macro information is saved, including the library name (in which to store the macro), the script or macro contents (as recorded by the macro recorder), and the user ID. Other information may also be saved and correlated to the macro as appropriate.

Later on, either moments later or days to years later, when the user decides to run the macro, the user may specify the macro to be run. Selection of the macro may be accomplished, for example, by selecting the macro name from a list of macros defined for the application(s) with which the user is currently interacting. For example, a list of macros that are accessible to the user may be stored in association with the user's account, and may be displayed to the user in a list (where the maker of each macro has provided an understandable name for the macro). Alternatively, selection of the macro may be made automatically, such as by the execution of another macro, by the occurrence of an event on the system independent of action by the particular user, or in other manners. The user may also make the saved macro available to other users, such as by being prompted for email addresses or other account identifiers of other users who the first user would like to have access to the macro. The user may also provide a group of other users, such as by pointing to a messaging group (e.g., an email list) or all users for a particular domain or sub-domain (e.g., all users accessing the system from the user's employer).

For example, input to run the macro may optionally be received at step 452a, such as from the user. Alternatively, a trigger event to run the macro may occur at step 452b. By either mechanism, macro code corresponding to the macro is received and executed at step 454.

At the initial stages of macro execution, objects are created at step 456 for the APIs corresponding to the application(s) associated with the macro. Such objects may represent objects needed to execute the macro, and may include, for example, objects translating commands from one format to another, objects that wrap other objects, quota imposing objects, and other such objects.

The objects are wrapped in a security wrapper at step 458. Such wrapping may occur by the mechanisms described above, and may be used to protect the user from execution of malicious code on the system.

At step 460, the application is called (or invoked or executed) with the user ID. Calling the application may be performed by the macro server sub-system 202. The user ID is included in the call in order to check authorizations, such as by insuring that the user in authorized to read, update or delete particular files, etc.

At step 462, actions are executed related to the steps to be performed in the called applications. For instance, the actions may correspond to individual instructions or steps that were recorded in a recorded macro. The execution of the steps occurs in the application, which may be physically remote from the browser upon which the macro was recorded. In fact, the macro may have been recorded and saved by an entirely different user on a different browser in some examples. In such a case, the different user may be a friend or family member who was authorized to use the macro by the user who originally recorded it.

At step 464, keys are returned that are necessary for further execution. These keys may include, for example, inputs provided by the user or parameters passed by the application itself. The "keys" returned from a target application (e.g., a spreadsheet application) may identify any items whose state may have changed as a result of the given command. For example, a command INSERT_SHEET may result in a new sheet being the "current" sheet. The macro may have other commands (e.g., getActiveSheet) that are operable to reflect the new, current sheet. Other commands (e.g., INSERT_ROW) may change the current selection, changing which cells are currently the active ones. Current state and selection data may be returned to the macro for storage in case any subsequent commands (e.g., getActiveSelection) need the information.

The steps 460, 462 and 464 may continue to run relatively simultaneously until the macro completes. The end may occur when the last instruction is encountered and executed at step 462, or when an event in the execution of the macro halts the execution of the macro.

Figure 5:
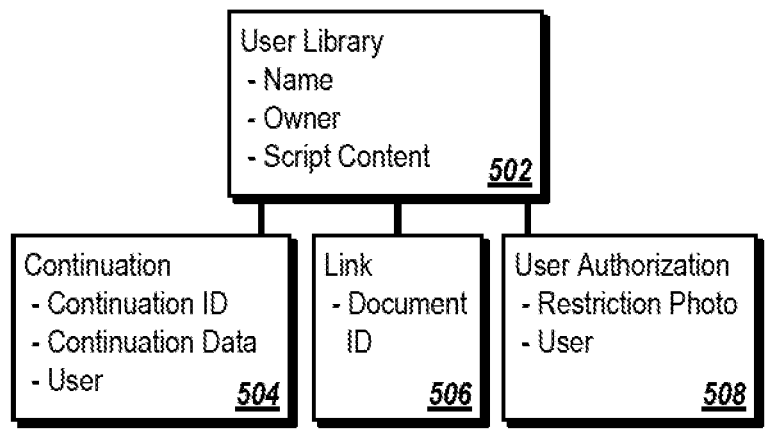
FIG. 5 shows an example structure for objects in a macro system.

FIG. 5 shows an example structure for objects in a macro system, specifically an example logical structure for information in structure such as the script information repository 206 in FIG. 2. The logical structure 500 is represented by nodes 502 through 508. For any one macro stored in the script information repository 206, for example, there may be at least one structure 500 or portions thereof. Continuation nodes 504, link nodes 506, and user authorization nodes 508 all have a 0 . . . N relationship to the user library node 502, meaning that for each user library (or header) node there may be any number of (including zero) continuations, links and user authorizations.

The root node of the structure is the user library node 502, which defines, for example, the name of the macro and/or library (e.g., "Macro_XYZ" in "Dan's Cloud-based MacroLib"), the macro library's owner (e.g., "Dan"), and the script (e.g., macro code) associated with the macro. Each macro library may have a unique identifier, such as a 64-bit pseudo-random number, which may also serve as a database primary key. In some implementations, fields such as the library name and the set of functions contained within the library are not used when retrieving a macro from the database; they are strictly for use when running/displaying the macro library. The "owner" field may be used, for example, as a foreign key with operations such as "get all macros owned by user XYZ." The link table may be used, for instance, with operations such as "get all macros used by document XYZ."

The continuation node 504 may include a continuation ID, continuation data (e.g., from additional entry points, such as for resuming the macro with additional inputs after the macro has gone into a wait state), and a user name (e.g., the user who created the continuation node 504). Multiple continuation nodes 504 may exist for a given macro. The "owner" of a continuation may be recorded primarily to prevent session hijacking so that, for example, user X cannot resume a macro that had been running as user Y. In this way, operations may ensure that only user Y can resume a macro which they initiated. Multiple such records may be allowed because one user may have several continuations (e.g., three open spreadsheets in separate windows, each with an active prompting dialog box). Multiple users may also be simultaneously running their own instance of a macro, each with their own dialog prompt.

The link node 504 permits outside entities to link to the macro. The link node 504 may include a document ID, which may be the URL or some other path name that "points to" the macro. Multiple link nodes 506 may exist, as there may be several different names for (and several different URL paths or other paths to) the same macro.

The user authorization node 508 may contain information that allows restricted access to the macro. For example, a restriction protobuffer field may control access using a protocol pattern of value, while a user field may control access based on a user ID. Either or both may be used in each node 508. Multiple user authorization nodes 508 may exist for a given macro, each one identifying a different authorization level. The user authorization node 508 may enforce the existence of only one authorization record per user, per macro. The enforcement may employ a representation of the user's stamp of approval for their execution of that macro, and the things that the macro may do. Multiple records may be allowed only because multiple different users may have each authorized the macro, and each may have authorized different actions for it to execute. When user X executes a macro, their authorization record for that macro is pulled up; all others are ignored.

If the requirements for a macro change (e.g., if the author adds a call to Blogger) which alters the requirements that the macro needs to run, the existing user authorizations may be marked as invalid. As a result, when a user tries to re-execute the macro after the additional requirement was added, they may be re-prompted for authorization. For example, the prompt may say "this macro requires access to Calendar and Blogger", where previously the macro may have simply said "this macro requires access to Calendar". Prompting may not be needed for re-authorization if services are deleted; only if the requirements increase.

FIG. 6 shows an example screen shot of a macro construction system 600. A user may use the system, for instance, to establish parameters and rules for macros which may subsequently execute, for example, based on external events, or may run manually when the user chooses. In general, the system organizes macro construction into three phases that are each shown in a column of the screen shot, and each phase (including sub-phases within each phase) may change as phases before it are configured. Using such a system, a user may quickly identify a trigger for a macro, parameters for operating the macro from available parameters relating to the selected trigger, and results of the macro that correspond to the selected parameters.

In one example, the user may construct a macro that performs an email function based on an email-related event. In another example, the macro may be constructed to perform operations in non-email-related applications (e.g., spreadsheets, word processing applications, etc.). In yet another example, the user may construct a macro that has output, yet does not depend on any triggering event. Regardless of the types of applications that are the triggers or the outputs, simply making user selections on the screen may automatically result in the construction of the corresponding macro. Software applications running "behind" the screen can, for example, process the user's inputs and selections on the interface shown in the screen shot of FIG. 6, and may automatically construct a macro, including inserting the appropriate macro syntax, various application- and language-specific API calls, and other components of the macro that are required for it to run. All of this may be transparent to the user who simply enters a few inputs in a few fields that make sense.

The screenshot 600 includes a macro name field 601, which identifies the macro currently being constructed (e.g., as defined initially by the user or updated later). As noted above, the definition for the macro may occur in three general areas: a macro trigger data area 602, a macro processing data area 604 and a macro output data area 606. The macro trigger data area 602 may include fields and controls that the user may employ to decide on and identify conditions or events under which the macro will be triggered. The macro processing data area 604 may be used to define the processing that will occur when the macro runs. The macro output data area 606 may identify the output of the macro, such as the type of application data upon which the macro will act and the action (or operation) that will occur on that data. Other data definition areas in addition to the data areas 602-606 may exist, such as multiple macro output data areas 606 if the data in multiple applications is to be updated by the same macro. In some implementations, commit/rollback techniques may be used to assure that all updates are made, or none at all, which may help to preserve data integrity.

The three data areas 602, 604, and 606 may be designed to be completed generally in sequence. In some implementations, the values selected by a user in one area may affect what is displayed on the field or control below, or to the right of that area. For instance, data entered in the macro trigger data area 602 may affect the types of fields and data selections that are displayed (and user-selectable) in the other areas (e.g., the data areas 604 and 606). For example, if the user selects "email" as the triggering mechanism of the macro (e.g., by specifying or selecting "email" in the property field 608), options available in the macro processing data area 604 may be tailored to email properties.

The macro trigger data area 602, as depicted in this example, includes a property field 608, an activity field 610, and a parameters field 611. The values displayed (and selectable by the user) in the activity field 610 may depend on the user's selection in the property field 608. For example, by selecting "email" in the property field 608, the values in the activity field 610 include email-related options (e.g., incoming message, inbox size, tag size, etc.) Selection of a different property (e.g., online auction) may result in a different list of entries (e.g., item amount, item category, etc.) in the activity field 610. The parameters field 611 may be used to assign a value to an activity. Potential values that the user may enter or select in the parameter field 611 may include, for example, sizes, colors, dollar amounts, time periods, language, gender or just about any quantitative or qualitative value that is appropriate for the particular application. In some implementations, the label on the parameters field 611 may be labeled automatically (e.g., size, color, price, etc.) depending on the value of the activity box 610.

The macro processing data area 604 includes a conditions field 612, a check services field 614, and a services values field 616. The conditions field 612 displays options for identifying conditions that will trigger certain actions by the macro (e.g., such as forwarding an incoming email in a certain manner). The exact values (e.g., "from user" or "from user in group" and so on) that are displayed in the conditions field 612 may depend, for example, on the user's entry (e.g., "email") in the property field 608. If the user selects a different value for the property field 608 (e.g., "spreadsheet"), a different set of values may be displayed in the conditions field 612 (e.g., related to spreadsheets).

The check services field 614 may identify services external to the application and macro to be checked by the macro in gathering information for the running of the macro. For example, by selecting "Locator" in the check services field 614, the user may be defining that the macro should check during its execution, the location of the sender, the location of user X, or the location of a specific user listed in the carbon copy line of an email, or other choices. The services values field 616 identifies what particular values are to be returned to the macro from the service or services that are referenced. The locations in this case may be, for example, based on near real-time GPS locations, locations tracked by cellular telephone triangulation, street addresses, ZIP codes, or any other appropriate locating criteria.

In some implementations, macro processing data area 604 may include various mechanisms for using Boolean operators in macros. These mechanisms may be in addition to the implicit "AND" that is suggested by having the conditions field 612 AND the check services field 614. For example, the conditions field 612 may be used with a set of any/all controls 617, depicted as radio buttons, which may facilitate the specification of explicit AND/OR operators and logic. For instance, the user may select the "Any" (or the "All") option of the any/all controls 617 in order to specify at that any (or all) of the individual options checked in the check services field 614 are to be considered for the macro.

In some implementations, additional Boolean controls and fields may be provided for other fields, etc. on the macro construction system 600, such as straight text input of field names, field values, Boolean operators and the well-placed parentheses. Those types of more advanced types of controls may be included, for example, on screens or other interfaces that may be reachable by selecting an advanced Boolean control 618. In some implementations, accessing the advanced Boolean control 618 may allow the user to see existing logic for the entire macro, and may include, for example, the current logic represented by updated user selections and inputs made in the data areas 602 through 606. The system 600 may perform automatic syntax checks and verify that fields entered by the user (or selected from a list) are compatible with values that they are checked against.

The macro output data area 606 includes a property field 620, an action field 622, and a parameters field 624. These fields may be used, for instance, to designate the particular output of the macro (e.g., do this, send that, update a particular file, field or spreadsheet cell). In the example shown in FIG. 6, "email" is selected for the property 620, resulting in email-related entries being displayed in the action field 622. Thus, the output for this macro will be to send an email of some form to some address or addresses.

The parameters field 624 may be used, when necessary (e.g., based on selections and fields above it), to assign a value to a field or selection. In some implementations, values of fields may be defined "behind" the field, so that double-clicking on a field name may display a popup for defining a value for the field, and hovering over a field may display the field's current value.

In the example macro construction screen depicted in FIG. 6, the macro trigger data area 602 is defined to trigger the macro when an "incoming message" (e.g., identified in the activity field 610) is received by an email application (e.g., per the property field 608). The macro processing data area 604 includes conditions 612 specifying a specific user, containing specific words in the body of the email, and based on the location of user X. The values for these conditions may be defined, for instance, in other parameters fields (not shown in FIG. 6). Thus, the macro will execute to completion if such conditions are met. The macro output data area 606 shows that "email" is the type of output of the current macro, and the action to be performed is "text me" (e.g., as defined in the action field 622). As a result of the values entered in the data areas 602 through 606, upon the detection of a triggering event of an incoming email message from a particular user, containing specific words in the subject line, and based on the user X's location, the macro uses a messaging application to send a text message to target of the incoming email, telling them that such an email was received. An advantage of the example macro construction screen is that it provides this information to the user in a concise GUI format, while hiding the underlying macro that performs the function, and the user does not even have to know how to write a macro or even how to recognize one. The screen may be used to construct a full macro or to construct part of a macro, wherein the user may add other code to the macro that could not be provided by the screen.

The user interface for defining macros may include buttons or controls 626, for example, to "save" the macro being input or updated, to "undo" one or more updates or changes to the macro, to "display" the resulting macro, or to "cancel" the edit without saving. A "copy from" field 628 may allow the user to create and define a new macro by copying an existing macro, or copying parameters for an existing macro so as to pre-set the screen in an initial state that the user may then alter. A description field 630 may allow the user to record the purpose of the macro, or to provide some level of meaning to the macro that is not captured in the macro's name.

In some implementations, macro definitions may have time elements associated with them, such as an effective date 632 for when the macro will first take effect, an expiration date 634 for when the macro will no longer execute, and a schedule or "run on" field 636 that may be used, for example, to specify the days (weekdays, Mondays, weekends, etc.) that the macro will execute. Date fields may include specific dates or date ranges and/or times, or may include enumeration types (e.g., now, never, weekdays, etc.).

In some implementations, the user interface provided by the system 600 may be adapted to execute on user devices having smaller displays, such as smartphones, etc. For example, the data areas 602 through 606 and other fields may be provided in sequence. In some implementations, scroll bars may be provided for the entire screen, allowing the user to navigate to one general area at a time.

The macros constructed using the system 600 may be used with the security aspects described above with respect to the systems 100 and 200 and FIGS. 1 and 2. In particular, each constructed macro may be wrapped in a capability-based security wrapper. The system 600 may include security-related fields (not shown) that may facilitate security, including for example, the names of other users who may use the macros and the extent to which they may perform operations (e.g., send emails, update spreadsheets, etc.).

Such capability-based security may provide benefits by taking into account a user's intentions when authorizing code to execute. In such a system, and by example, the executing user creates objects, called capabilities, that encapsulate each operation that the user wishes to allow, and passes these objects to un-trusted code that is to execute. These objects become part of the payload (e.g., part of the wrapper) when un-trusted code is executed by the system, and are not modifiable or creatable by the un-trusted code. When the un-trusted code attempts to access an underlying, trusted resource (e.g., conventionally, a file system, etc.) it may only do so via an object the user created that wraps the trusted resource. Capabilities can allow fine-grained control over access to be granted to un-trusted code and may be used to construct an execution environment that adheres to the principle of least privilege. This means that any given module may only perform the smallest set of actions that are necessary for it to be able to do its function, and no more.

Having described example systems and processes regarding a hosted macro-based system, the following paragraphs describe a series of examples for employing such systems and processes, many of which discuss how a system can use capability-based security to handle each of these cases, and how to mitigate some risks that may be part of such examples.

EXAMPLE #1

Sales Policy Enforcement

Consider a scenario in which the sales department for an organization is creating, in a spreadsheet, proposals for potential customers. The spreadsheet contains the cost of all products and features that the company produces. As the salesperson goes down the sheet, he or she may mark a feature as active or inactive (i.e., currently available for sale) with a 1 or 0 in the column next to the feature. The sheet may contain formulas to compute pricing, including various discounts and price multipliers.

There may be many dependencies between the line items, for example, including some features that may be mutually exclusive. These rules could be expressed as macros. Alternately, the rules could be expressed in a rule language that would be compiled into macros attached to the sheet to enforce the rules. Additional rules may include error checks and other consistency checks. In addition, there may be rules associated with promotions or triggered events based on region or other factors.

One thing to consider about such rules is how they would be administered. For example, it may be helpful to have the macros and/or rules live in a shared library that the sheet references, so that an administrator can readily update values in the sheet. Also, the macro should be part of a suite of tools that a system administrator provides to various small business owners, and may permit each of those users to access and execute the macro. The administrator may keep the macro updated from a central location on an hosted system, and the users can all execute the macro from that location.

Thus, the macro may be published in a shared mode, with a single "slot" for each spreadsheet that accesses the macro. Another user may import the macro into their spreadsheet by including a URL that points to the macro in their spreadsheet, and may grant it the authority to write to that spreadsheet.

EXAMPLE #2

Investment User Interface

Consider a scenario in which an investment firm has pricing models in a spreadsheet, and would like to pull stock quotes from an external service and inject them into a spreadsheet to generate recommendations (e.g., buy, hold, etc.).

The script may need to read from and write to the spreadsheet, and to access an external stock quote service. The author may grant the script access that restricts the script to only the specific stock quote service. If the author were to leave that slot empty, a user who invokes the service should be asked not only whether to grant the script the authority to contact a service but which specific service to contact. That way, the user may constrain what the script can do; the script will not be able to contact any other service.

If a user wanted to share this macro with other users for inclusion in their own spreadsheets (e.g., to copy the macro rather than reference it), the other users would need their own authority to access the external stock quote service. If the user shares the macro by letting others point to it at a central location, users may be able to use the macro even if they themselves do not have the authority to contact an external stock quote service. They could, in such a situation, be granted the authority that the script itself has (though they may not be able to access the service from their own scripts).

EXAMPLE #3

Accident Reporting

Consider a scenario in which a bus transportation company is interested in automating its accident reporting. A driver who gets into an accident may access a hosted service to fill out a form in a spreadsheet that records information such as the location of the bus, etc. A macro may be used to route the report to various supervisors for their review.

The macro may need to identify a supervisor (e.g., via another spreadsheet it has access to, a database query, etc.), generate a correct email address of the legal department, and share the document with those people, as well as send an email, and access other spreadsheets (e.g., a spreadsheet that includes a record of which accident reports are pending). It may be that those people will need to edit the spreadsheet further and then trigger an event that moves the macro forward. The macro can run in continuation mode, so that it pauses each time a particular user has addresses a phase of the macro, and then waits for a next user to pick it up. When awakened by an event, it may check to see who has signed off on the document (e.g., as recorded in the document itself or recorded in information in the event sent to the macro), and may wait until everyone who needs to sign off has done so, at which point the macro may then notify someone else and record that the incident has been fully processed (e.g., in yet another spreadsheet). In some implementations, if two events arrive at the same time, they may get queued, so the macro only processes one continuation at a time. The workflow state can be held simply in the local variable context of the macro, as well as partially recorded in spreadsheets.

In a related scenario, accident reports that haven't been fully processed and closed out (e.g., based on workflow) can be queried. This query could require accessing the spreadsheet that contains state information about the accident reports (or simply opening the spreadsheet).

EXAMPLE #4

Bus Schedule Reporting

Consider a scenario in which a bus transportation company would like to be able to notify customers of delays on certain bus lines. The company can edit a spreadsheet to update the expected times/locations of their buses, and such editing may occur automatically, such as by a macro that receives location data on the buses and computes estimated times of arrival based on such information (e.g., by identifying the bus as leaving stop X, and adding time Y to compute an arrival time at stop X+1). A macro in the spreadsheet can identify when certain bus lines are unusually delayed, and if so, it can send text messages to customers who have signed up for notification. For example, a user could subscribe to receive a text message whenever the user is downtown and within two blocks of his normal bus stop and any of the user's en route buses (e.g., bus numbers 692, 698, etc.) are likely to arrive at that corner more than five minutes late. An application on the user's mobile device may trigger when the user is in the appropriate location, so as to cause a hosted service to activate a flag on the user's record so that the user receives updates directed to the user's current location without the user having to enter the location manually (e.g., by converting the user's GPS coordinates to a nearest bus stop location).

For security purposes, the author of the macro could grant the capability to send a text message to a limited set of users (e.g., those listed in another spreadsheet, controlled by administrators), and likely publish this macro to be local only to the sheet, and not publicly accessible. The author would not grant the macro the capability of writing to the sheet. This scenario brings up the possibility of specifying the breadth of a capability by referring to a group defined in a document or other collection (e.g., a spreadsheet or some other group definition).

EXAMPLE #5

Location Based Event Trigger

Consider a scenario in which one user updates a set of concert recommendations in a spreadsheet, including the address and date/time of each concert. Other users may subscribe to notifications from this spreadsheet, by asking to be notified whenever they are in the neighborhood of one of these concerts, and the time for a concert is getting close. Notifications in this case may use, for example, services such as a mapping service, a social networking service (to identify the friends of the user who makes the recommendations), a location service (for identifying when friends are in a particular location), and a text messaging service to send the notifications. Thus, a hosted macro is particularly well-suited in such a scenario.

EXAMPLE #6

Surveys

Consider a scenario in which a user creates a survey or other data entry form, sends an email form to a number of other users, and adds a line to a spreadsheet that indicates how each user filled out the form.

The macro should be granted the capability to email a set of people from a certain address to a set of addresses provided by the user. The macro could track the receipt of data in the form from each user, such as by accessing a user identification feature from a hosted service or by identifying a user ID (e.g., an email address) in the response. The macro may then access the spreadsheet, enter the user ID into one column of the spreadsheet, and the user answer or answers into other columns of the spreadsheet. In this manner, a first user can quickly send a form to a group (e.g., as determined from an existing friends list or email list) and automatically tabulate comments from the group.

EXAMPLE #7

Purchase Order Approval

Consider a scenario in which a user initiates a purchase order (e.g., "I want X thousand cases of Q-tips, and I prefer vendor XYZ"). When the user submits the purchase order (PO), a macro can determine, based on data such as the items, the total price, the department, etc., who needs to approve the PO. For example, if the total is greater than a fixed threshold, the PO could require chair approval. As approvers approve the PO, it can be moved along a workflow, such as a list of users defined in the macro, a database, or a spreadsheet; the macro will keep local state to remember who has and has not approved the PO; when all approvers have approved, the PO is sent to purchasing.

This macro can run best in terms of continuations. The macro would have the capability to email certain users with a link or attachment to a document with forms or URLs that those users may click to approve or disapprove a given purchase order, would have access to other spreadsheets or databases with information such as the department chairs, etc.

EXAMPLE #8

Mail Merge

Consider a scenario in which a user has a names spreadsheet of names, addresses, email addresses, etc., and another document (e.g., email, spreadsheet, etc.) and would like to replace fields in the latter document with the fields from the list, and email the merged document(s) to the recipients specified in the names sheet.

For security, this is a macro that can run entirely within the context of a specific document and a list of names. The capabilities are: "allow emailing to the list, as specified in the first column of this table" as well as access to a template document. The macro itself emails people in the list with data computed from a spreadsheet line and some templates. Particular forms for a mail merging macro are well known.

EXAMPLE #9

Doctor Shift Scheduling

Consider a scenario in which a number of doctors are accessing the same spreadsheet and editing it. A macro could check the spreadsheet to make sure that each doctor was following formatting or scheduling rules (e.g., maximum or minimum number of shifts in a time period) for the spreadsheet. Each user could be able to click a button to run a macro to synchronize the sheet with a calendar application, for example, for more intuitive access (e.g., for creating repeating schedules). Two-way synchronization may also occur.

The macro may be extended to be able to interface with a variety of other calendar applications. The macro may also help doctors verify that they are following the rules, to help them keep track of how many shifts they've signed up for, and to sync the spreadsheet with a calendar application

EXAMPLE #10

Email Plug-in

A user may define a macro to identify each instance of an incoming email to their account and cause the sender identification and subject line of the email to be copied from the email and into a next open line of a spreadsheet that is associated with the user's account. In this manner, the user may automatically keep an up-to-date log of incoming emails to their account.

EXAMPLE #11

Blogging Plug-In

A user who is a blogger on a service may develop a macro for handling user comments to the blog. For example, information about a commenter may be used, such as to show a location of the commenter next to the comment (e.g., using an IP address corresponding to the comment from the user). In addition, the user may have all comments compared against a blacklist of trigger words, such as profanity, so that the user receives a text message alert whenever a comment is posted that contains an improper word. The user could then log into the blog to clean it up

EXAMPLE #12

Billable Hours

A user who is a consultant may track his or her billable hours in a calendar application. They could use a macro to periodically (e.g., each week or each month) parse out such entries (e.g., by recognizing a time entry in the form x.x). The Macro could then use text associated with the entry to identify a project number to which the time should be billed (e.g., a list that correlates keywords and client names to certain distinct projects), and may then add data to cells in a spreadsheet to execute the billing operation. The macro may then merge the values from the spreadsheet (after applying a per-hour rate for billing) into an invoice generated by a word processing program, and may then email the resulting document to the client. If the client is a registered user of the hosted system, the macro may make a direct request for payment (including via a form that includes a selectable mechanism that the client can use to indicate an intent to pay the bill), and the client may subsequently select the control to have money transferred from a client account to a consultant account.

EXAMPLE #13

Driving Directions Mail Merge

A user of a hosted system may wish to send invitations for an upcoming party to a number of his or her friends. The user may thus prepare a shell for an invitation to the party. The user may then point a macro to a list of the friends and their addresses (e.g., in a contacts application on the hosted system) to perform, in effect, a mail merge into the invitation. However, the user may also supply their own address (the location of the party) and the address from the list, of the friend whose invitation is currently being prepared, to a mapping service, which may, according to a standard API, return an image that shows a map having driving directions between the friend's house and the party superimposed on it. The macro may incorporate the image into the invitation, which may then be sent to the friend, with automatically and custom generated directions.

Figure 7:
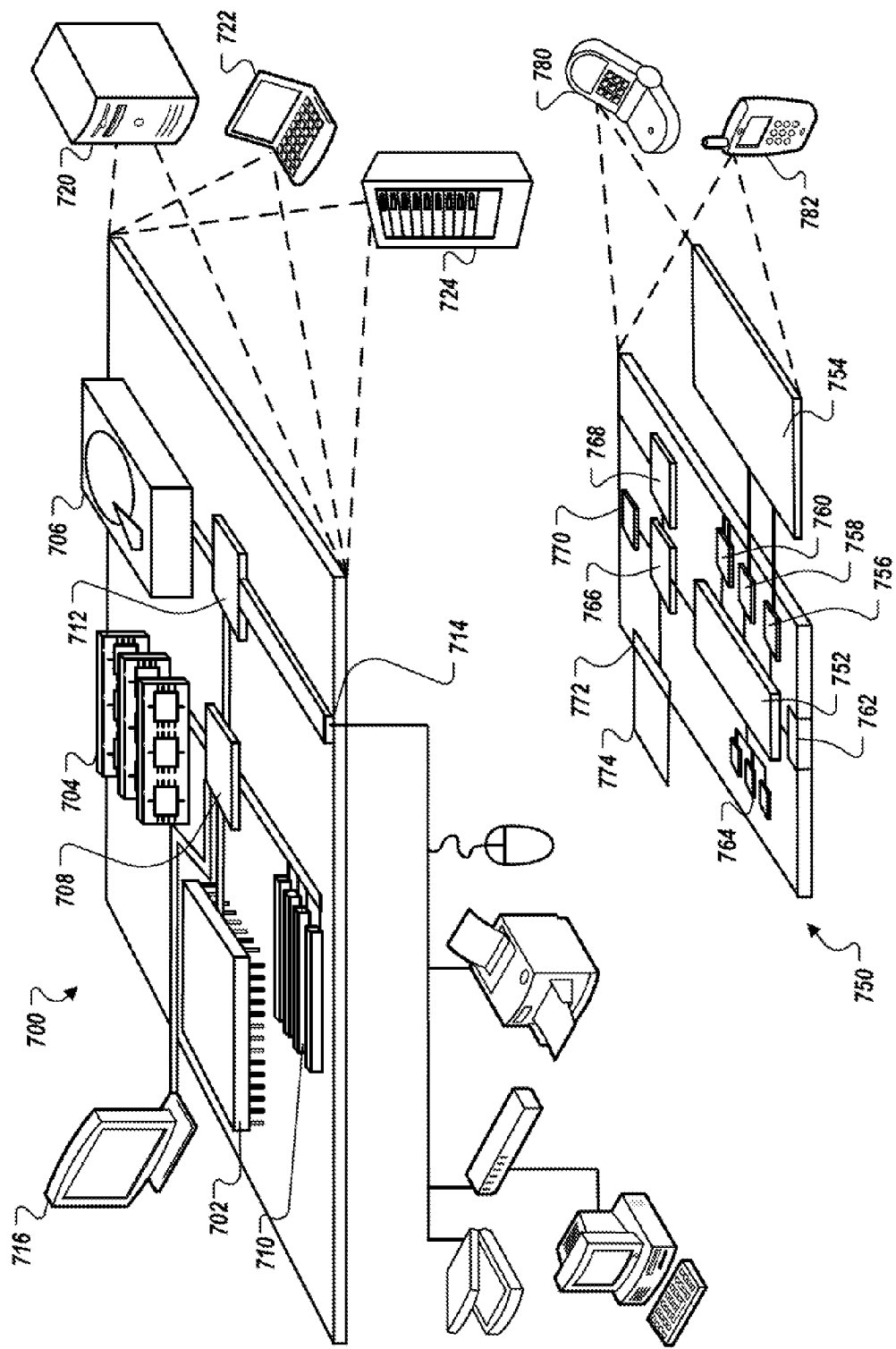
FIG. 7 shows examples of generic computer devices that can be used to execute the actions discussed in this document.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 may process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 may execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 may be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Device 750 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 750 and used to update the display of the respective devices 750 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular mechanisms for interfacing between macros written for a first language and applications designed to communicate in different languages, but other mechanisms for providing a single development environment across multiple systems may be employed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method of managing computer macros, comprising:
    identifying a macro stored at a hosted computer system;
    executing the macro by traversing lines of commands in the macro;
    identifying a service in a service registry that is responsive to the macro, the service registry being stored at the hosted computer system;
    converting a command in the macro from a format associated with a macro language in which the macro is authored, to a command format associated with the identified service;
    determining whether a call to the identified service from a user account corresponding to the macro exceeds a predetermined quota, wherein:
        the predetermined quota is defined by a number of executions of the macro by the user account in a time period,
        the number of executions defining the predetermined quota is based on a quota configuration associated with the user account; and
    preventing execution of the macro if the call exceeds the predetermined quota; and
    providing, if the call does not exceed the predetermined quota, information received from the identified service to the macro or an application corresponding to the macro, after converting the information into a format usable by the macro or the application corresponding to the macro;
    wherein converting a command in the macro from a format associated with a macro language in which the macro is authored to a command format associated with the identified service comprises applying portions of the macro to a translation table stored on the hosted computer system.

2. The computer-implemented method of claim 1, wherein the macro is identified from a uniform resource locator (URL) that calls the macro and that includes a path and name for the macro.

3. The computer-implemented method of claim 1, wherein providing information received from the identified service comprises providing the information through a masqueraded object that hides characteristics of an object used to obtain the information from the identified service.

4. The computer-implemented method of claim 1, wherein determining whether the call to the identified service from the user account corresponding to the macro exceeds the predetermined quota further comprises wrapping the macro in a quota wrapper that operates as an adapter between the macro and one or more objects, and implements use restrictions on the macro.

5. The computer-implemented method of claim 1, further comprising receiving notice of an event on a hosted computer system, wherein the event is independent of a user's status on the hosted computer system, associating the event with the macro and the user account with the hosted computer system, and executing the macro on the user's account.

6. The computer-implemented method of claim 1, further comprising converting a command in the macro from a format associated with the language in which the macro is authored, to a command format associated with an application so as to control the application using the macro.

7. The computer-implemented method of claim 6, further comprising transmitting a message to a user to notify the user about an operation of the application.

8. The computer-implemented method of claim 7, wherein the message is selected from a group consisting of an electronic mail message, a telephone voice message, and a text message.

9. The computer-implemented method of claim 1, wherein the identified service is selected from a group consisting of a location service, an email service, and a simple object access protocol (SOAP) service.

10. The computer-implemented method of claim 1, wherein converting the command in the macro from the format associated with the macro language in which the macro is authored, to the command format associated with the identified service comprises wrapping an access method to the service using a Java object.

11. The computer-implemented method of claim 1 further comprising determining whether a call to the identified service from a user corresponding to the executing macro is authorized, and preventing execution of the macro without positive user indications regarding the macro.

12. A system comprising:
    one or more computers and one or more storage devices storing instructions that are operable, when executed by the one or more computers, to cause the one or more computers to perform operations comprising:
    identifying a macro stored at a hosted computer system;
    executing the macro by traversing lines of commands in the macro;
    identifying a service in a service registry that is responsive to the macro, the service registry being stored at the hosted computer system;
    converting a command in the macro from a format associated with a macro language in which the macro is authored, to a command format associated with the identified service;
    determining whether a call to the identified service from a user account corresponding to the macro exceeds a predetermined quota, wherein:
        the predetermined quota is defined by a number of executions of the macro by the user account in a time period,
        the number of executions is based on a quota configuration associated with the user account;
    preventing execution of the macro if the call exceeds the predetermined quota; and
    providing, if the call does not exceed the predetermined quota, information received from the identified service to the macro or an application corresponding to the macro, after converting the information into a format usable by the macro or the application corresponding to the macro;
    wherein converting a command in the macro from a format associated with a macro language in which the macro is authored to a command format associated with the identified service comprises applying portions of the macro to a translation table stored on the hosted computer system.

13. The system of claim 12, wherein the macro is identified from a uniform resource locator (URL that calls the macro and that includes a path and name for the macro.

14. The system of claim 12, further comprising converting a command in the macro from a format associated with the language in which the macro is authored, to a command format associated with an application so as to control the application using the macro.

15. The system of claim 12, wherein the identified service is selected from a group consisting of a location service, an email service, and a simple object access protocol (SOAP) service.

16. The system of claim 12, wherein converting the command in the macro from the format associated with the macro language in which the macro is authored to the command format associated with the identified service comprises wrapping an access method to the service using a Java object.

17. The system of claim 12 further comprising determining whether a call to the identified service from a user corresponding to the executing macro is authorized, and preventing execution of the macro without positive user indications regarding the macro.

18. A non-transitory computer-readable medium storing software comprising instructions executable by one or more computers which, upon such execution, cause the one or more computers to perform operations comprising:
  identifying a macro stored at a hosted computer system;
  executing the macro by traversing lines of commands in the macro;
  identifying a service in a service registry that is responsive to the macro, the service registry being stored at the hosted computer system;
  converting a command in the macro from a format associated with a macro language in which the macro is authored, to a command format associated with the identified service; and
  determining whether a call to the identified service from a user account corresponding to the macro exceeds a predetermined quota, wherein:
    the predetermined quota is defined by a number of executions of the macro by the user account in a time period,
    the number of executions defining the predetermined quota is based on a quota configuration associated with the user account;
  preventing execution of the macro if the call exceeds the predetermined quota; and
  providing, if the call does not exceed the predetermined quota, information received from the identified service to the macro or an application corresponding to the macro, after converting the information into a format usable by the macro or the application corresponding to the macro;
  wherein converting a command in the macro from a format associated with a macro language in which the macro is authored, to a command format associated with the identified service comprises applying portions of the macro to a translation table stored on the hosted computer system.

19. The computer-implemented method of claim 1, wherein the quota configuration associated with the user account comprises a base quota level, and the number of executions for that user account is based on a comparison of the base quota level to a predetermined baseline quota level.

* * * * *